United States Patent Office 3,334,136
Patented Aug. 1, 1967

3,334,136
SALTS OF CERTAIN POLYHEDRAL POLY-
BORATES AND THEIR PREPARATION
Walter H. Knoth, Jr., Mendenhall, Pa., and Norman E.
Miller, Wilmington Del., assignors to E. I. du Pont de
Nemours and Company, Wilmington, Del., a corporation of Delaware
No Drawing. Filed July 9, 1963, Ser. No. 294,794
17 Claims. (Cl. 260—534)

This invention relates to new boron compounds, more particularly, to a new class of polyhydropolyborates, and their preparation.

Boron compounds, particularly borates or simple derivatives of borates, are valuable industrial products of many years standing. In recent years interest has developed in compounds containing boron and hydrogen and in particular, in stable compounds of boron and hydrogen. A need exists for compounds of high boron content which have good hydrolytic and oxidative stability.

A new class of boron compounds has now been found which not only possess excellent stability but which are also versatile intermediates for the preparation of a wide range of boron-containing products.

The new compounds are polyborates which consist of (a) an element or group of elements which can form cations in aqueous solution, and (b) an anion-forming group composed of two polyborate units of 10 or 12 boron atoms each, which units are joined through a carbonyl group,

by single valences emanating from boron atoms in each of the polyborate units (i.e., from boron atoms in non-common polyborate units).

The novel compounds are represented by the formula (1)

or, alternatively, $M_a[AC(O)A']_b$ where M is a cation, i.e., an element or group of elements which form positively charged ions (cations) in aqueous solution; A is a group bonded to one valence of the —C(O)— group by a single bond emanating from boron and selected from

and
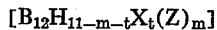

where X is a monovalent radical or group bondable to carbon of an aromatic nucleus by replacement of hydrogen and is selected from the group consisting of halogens (F, Cl, Br, I), hydrocarbon, carboxyl

carbamyl and N-substituted carbamyl

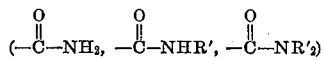

azido ($N_3$), halocarbonyl

where Y is F, Cl, Br, I, halomethyl (—$CH_2Y$), hydroxy (—OH), hydrocarbyloxy (—OR'), acetyl

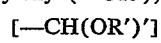

ketal [—$CR'(OR')_2$], hydrocarbylcarbonyloxy

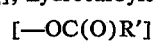

hydrocarbyloxycarbonyl [—C(O)OR'], isocyanato (—NCO)

thiocyanato (—CNS), isothiocyanato (—NCS), hydrocarbylthio (—SR'), hydroxymethyl (—$CH_2OH$), hydrocarbyloxymethyl (—$CH_2OR'$), dihydrocarbylaminomethyl (—$CH_2NR_2'$), cyano (—CN), amino (—$NH_2$), substituted amino (—NHR', —$NR_2'$), trihalomethyl (—$CCl_3$, —$CF_3$, etc.), acyl

aldehyde

nitro (—$NO_2$), nitroso (—NO), azo (—N=N—Ar, where Ar is an aromatic hydrocarbon of up to 10 carbons), sulfo (—$SO_3H$), sulfonyl (—$SO_2R'$), and acetoxymercury

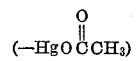

wherein R' is a monovalent hydrocarbyl group of at most 18 carbon atoms;

Z is selected from the class consisting of (a) $SR_2^2$ wherein $R^2$ is hydrocarbyl of up to 18 carbon atoms free of acetylenic unsaturation which can contain up to two substituents selected from the class consisting of halogen; —OH; —$NO_2$; —COOH and metal and nitrogen-base salts thereof; —$NH_2$, (lower alkyl)NH, di(lower alkyl)N, and salts thereof; —C(O)$NH_2$;

—C(O)NHQ

—C(O)$NQ_2$; —C(O)OQ; —OC(O)OQ, —CN,

—NHC(O)$NH_2$ and —NHC(O)NHQ, wherein Q is hydrocarbyl of up to 8 carbon atoms free of acetylenic unsaturation, and groups wherein the two $R^2$'s are joined together to form a ring with the sulfur of up to 5 carbon atoms; (b) $R_2'SO_2$, (c) $R_3''P$, (d) $R_3'N$, (e) HC(O)$NR_2'$, (f) R'C(O)$NR_2'$, (g) R'CN and (h) CO wherein R' is hydrocarbyl of up to 18 carbon atoms, and any two R' groups in the same entity can be joined together to form a ring with the heteroatom; m is a cardinal whole number of up to 2, i.e., m is 0, 1 or 2; s is a cardinal whole number of 0 to (9—m) and t is a cardinal whole number of 0 to (11—m); A' is a group bonded to the second valence of the —C(O)— group by a single bond emanating from boron and selected from

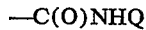
and
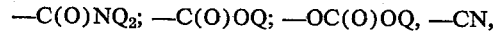

where X and Z are defined as above, n is a cardinal whole number of up to 1, i.e., n is 0 or 1; v is a cardinal whole number of 0 to (9—n); and p is a cardinal whole number of 0 to (11—n); a and b are positive whole numbers of 1–4 whose values are determined by the valences of M and [AC(O)A'] according to the following equation:

(2) $$b = \frac{a \times \text{valence of M}}{4-(m+n)}$$

In Equation 2, the divisor, i.e., 4—(m+n) represents the absolute value of the negative ionic charge or valence of the anion, AC(O)A', in Formula 1. The X or Z components, when more than one is present, can be the same or different.

The new compounds are ionic in character, i.e., they form cations and anions in aqueous solution. The characterizing and novel feature of the compounds resides in the anion-forming group. This group will be discussed more fully in later paragraphs but it can be noted at this point that the anions are formed of polyhedral boron cage structures of 10 or 12 boron atoms which are joined by carbonylic group, i.e., a group which is shown in the formulas as $$-\overset{\overset{O}{\|}}{C}- \text{ or } -C(O)-$$

in which the single valences emanating from the carbon are bonded to boron atoms in separate cage units. The carbonylic group can be viewed as analogous, but not necessarily equivalent, to the ketone group in organic chemistry. The compounds may also contain a CO group (referred to as carbon monoxide) which is designated in the formulas simply as (CO). It is one of the groups from which the Z component is selected and it is covalently bonded to one and only one boron cage unit.

A preferred group of compounds of the invention has, as a common characteristic, anions consisting of two $B_{10}$ cages joined by the $-C(O)-$ group in which one cage (A') contains up to one Z component, which component, if present, is (CO), and the second cage (A) contains up to two Z components, which, if present, are organic sulfides of the formula $SR_2^2$. This preferred group is represented by the following formula:

(3) $M_a[B_{10}H_{9-m-s}X_s(SR_2^2)_mC(O)B_{10}H_{9-n-v}X_v(CO)_n]_b$ in which M, X, a, b, m, n, s, and v, are defined in Formulas 1 and 2 and $R^2$ is defined as above.

A second preferred group of compounds of the invention has, as a common characteristic, anions consisting of a $B_{10}$ cage joined through the $-C(O)-$ group to a $B_{12}$ cage in which the $B_{12}$ cage (A') contains up to one Z component which, if present, is (CO) and the $B_{10}$ cage (A) contains up to two Z components which, if present, are organic sulfides of the formula $SR_2^2$. This preferred group is represented by the following formula:

(4) $M_a[B_{10}H_{9-m-s}X_s(SR_2^2)_mC(O)B_{12}H_{11-n-p}X_p(CO)_n]_b$ where M, X, a, b, m, n, p, and s are defined as in Formulas 1 and 2.

One group of preferred X substituents are halogens (F, Cl, Br, and I), carboxyl [—C(O)OH], amine groups (—NRR', where R and R' are hydrogen or hydrocarbon of up to 18 carbons) and isocyanato (—NCO). Compounds containing these X substituents are preferred because of ease of preparation and their value as intermediates for preparing compounds with a broad range of X groups.

An especially preferred group consists of compounds of Formula 1 in which X groups, if present, on component A are halogen and, on component A', are halogen and at most one carboxy or amino group. This preferred group of compounds can be represented by Formulas 5 and 6, as follows:

(5) $M_a[B_{10}H_{9-m-s}(Hal)_s(SR_2^2)_m C(O)B_{10}H_{9-n-v}(Hal)_v(X')_{v'}]_b$ and (6) $M_a[B_{10}H_{9-m-s}(Hal)_s(SR_2^2)_m C(O)B_{12}H_{11-n-p}(Hal)_p(X')_{p'}]_b$ where (Hal) represents halogen (F, Cl, Br, and I), X' represents carboxyl or amino, v' and p' are each 0 or 1 (as in previous formulas, although now applied to X'); M, a, b, m, s, p, and v are defined as for the A and A' groups in Formulas 1 and 2.

The compounds of the invention can be free of X substituents, i.e., the boron cages can consist of polyhydrodecaborates or polyhydrododecaborates which are represented by Formulas 7, 8 and 9, and which form another preferred group, as follows:

(7) $M_a[B_{10}H_{9-m}(SR_2^2)_mC(O)B_{10}H_{9-n}(CO)_n]_b$ (8) $M_a[B_{10}H_{9-m}(SR_2^2)_mC(O)B_{12}H_{11-n}(CO)_n]_b$ and (9) $M_a[B_{12}H_{11-m}(SR_2^2)_mC(O)B_{12}H_{11-n}(CO)_n]_b$ where M, a, b, m, and n are defined as in Formulas 1 and 2.

The compounds of the invention can be free of Z groups, i.e., the boron cages can consist of polyhydrodecaborates and polyhydrododecaborates which are represented by Formulas 10, 11 and 12, and which form a further preferred group, as follows:

(10) $M_{a'}[B_{10}H_{9-s'}X_{s'}C(O)B_{10}H_{9-s'}X_{s'}]_{b'}$

(11) $M_{a'}[B_{10}H_{9-s'}X_{s'}C(O)B_{12}H_{11-p'}X_{p'}]_{b'}$ and

(12) $M_{a'}[B_{12}H_{11-p'}X_{p'}C(O)B_{12}H_{11-p'}X_{p'}]_{b'}$ where M and X are defined as in Formula 1, p' is a cardinal number of up to 11, inclusive, i.e., 0 to 11; s' is a cardinal number of up to 9, inclusive, i.e., 0 to 9; a' and b' are positive whole numbers of 1 to 4 whose values are determined by the valence of M according to the following equation

(13) $$b' = \frac{a' \times \text{valence of M}}{4}$$

In Equation 13 the divisor, 4, represents the valence of the anion.

Finally, the compounds of the invention can be free of both X and Z groups and these compounds represent the simplest form of the invention, as shown in Formulas 14, 15, and 16.

(14) $M_{a'}[B_{10}H_9C(O)B_{10}H_9]_{b'}$

(15) $M_{a'}[B_{10}H_9C(O)B_{12}H_{11}]_{b'}$ and

(16) $M_{a'}[B_{12}H_{11}C(O)B_{12}H_{11}]_{b'}$ where M, a' and b' are defined as in Formulas 10 to 12.

The compounds of the invention are stable crystalline products which are salt-like in character. They ionize readily in aqueous solutions and have stability characteristics which are unique among boron compounds. The compounds generally show hydrolytic, oxidative and chemical stabilities normally associated with aromatic organic compounds.

THE GROUP M

In the formulas given earlier for the novel compounds, M is a group which can be composed of one element or more than one element and which is ionically bonded to the boron-containing group, represented in generic Formula 1 as [AC(O)A']. The principal function of M in the compounds is to provide the necessary positive charges to combine with the boron-containing anion and thereby permits its isolation as a compound.

The groups represented by M, therefore, bear one or more positive ionic charges and they have in common the property of forming positively charged groups or cations in water. Except for the positive charge, the properties of these groups are not critical. The group M represents a broad range of elements and combinations of elements. To illustrate, M can be hydrogen, hydronium ($H_3O^+$), a metal, ammonium ($NH_4^+$), hydrazonium ($NH_2NH_3^+$), N-substituted ammonium, N-substituted hydrazonium, aryldiazonium, sulfonium, phosphonium, metal-ammine, long chain alkyl pyridinium, and the like.

To illustrate further, M can be lithium, sodium, cesium, beryllium, barium, lanthanum, zirconium, vanadium, magnesium, iron, cobalt, copper, zinc, mercury, aluminum, europium, thallium, tin, lead, antimony, bismuth, silver or any other metal.

As further more specific examples, M can be $RNH_3^+$, $R_2NH_2^+$, $R_3NH^+$, $R_4N^+$, $(RNHNH_3)^+$, $(R_2NNH_3)^+$, $(R_2NNR_2H)^+$, $R_3S^+$, or $R_4P^+$, where R is an organic radical bonded to the nitrogen, sulfur or phosphorus. The R groups are not critical features of these cation groups. The substituents represented by R can be open-chain or closed-chain, saturated or unsaturated, or the groups can be composed of heterocyclic rings of which the nitrogen, sulfur or phosphorus is a component, e.g., pyridine, quinoline, morpholine, hexamethyleneimine, and the like. Preferably R, for reasons of availability of reactants, represents a hydrocarbon group of at most 18 carbons.

The group M can be a Werner-type coordination complex, e.g., a metal-ammine such as $[Ni(NH_3)_6]^{+2}$, $[Zn(NH_3)_6]^{+2}$, $[Co(NH_2C_2H_4NH_2)_3]^{+2}$, $[Co(NH_3)_6]^{+3}$, and the like.

THE GROUP [AC(O)A']

The group [AC(O)A'] is the characterizing and novel feature of the compounds of the invention. The group forms an anion in aqueous solution which will have a valence of 1 to 4. It behaves as a stable chemical entity or radical in conventional reactions, e.g., in metathetic reactions the group is carried through unchanged.

The anion contains two polyborate components, designated as A and A', which consist of 10 or 12 boron atoms. The polyborate components can contain other groups designated as Z and X in the formulas defining the compounds. Each of these components will be discussed more fully in later paragraphs.

The negative ionic charge on the group, also referred to as the valence of the anion, is related to the number of Z groups which are present in the A and A' moieties, as shown by the subscripts $m$ and $n$ in the discussion of Formula 1. When no Z groups are present ($m+n=0$), the valence of the anion is 4; when one Z group is present ($m+n=1$), the valence is 3; when two Z groups are present ($m+n=2$), the valence is 2; and when three Z groups are present ($m+n=3$), the valence is 1.

There may be electrical charges arising from the nature of the X and Z groups in addition to the charge associated with the A and A' units, as described above. For example, X or Z may bear carboxyl substituents which, in ionic form, require the presence of a cation. As a further illustration, X or Z may bear basic groups, e.g., —$NH_2$ which will form ionizable salts with acids. Cations and anions derived from X and Z groups are considered to be part of these groups and these cations and anions are therefore included within the scope of the definition of X and Z.

*Polyborate groups.*—These groups, in their simplest forms, are polyhydrodecaborates and polyhydrododecaborates in which the boron atoms are deemed to be joined to form a skeleton-like unit or cage in which each boron atom is adjacent to at least four other boron atoms. The groups are joined through single chemical bonds to the divalent —C(O)— radical, forming a B—C(O)—B bond, and each of the remaining boron atoms in the cage structures (considering the product in its simplest form, i.e., free of X and Z groups) is bonded to a hydrogen atom.

The boron-containing components, i.e., the decaborate and dodecaborate cage groups, function as units and, although entirely inorganic in structure, they undergo electrophilic substitution reactions in a manner which resembles the behavior of carbocyclic aromatic compounds, e.g., benzene and naphthalene. More specifically, hydrogens bonded to borons in the compounds represented by Formulas 1 through 16 are replaceable by substituents which can also replace hydrogens bonded to nuclear carbons in benzene or a substituted benzene. This behavior of the boron-containing entities of Formulas 1 through 16 is particularly surprising in view of the inorganic composition of the group. The substituents which replace the hydrogens and which fall within the scope of X in the formulas of the compounds of the invention are defined in more detail in the following paragraphs.

*Group X.*—This group, in its broadest aspects, can be considered as a group capable of bonding to carbon of an aromatic ring by replacement of hydrogen, e.g., a group capable of bonding to a nuclear carbon of benzene, naphthalene, xylene, and the like. The group X is present in the compounds only when the subscripts $s$, $t$, $v$, or $p$ in Formulas 1 to 12 have a value of at least 1.

The definition of X, as stated above, is based on the close similarity in chemical substitution reactions between the essentially inorganic boron-hydrogen cage of the compounds of Formulas 14 to 16 and the classical aromatic carbon-hydrogen rings of organic chemistry.

The group X is introduced by a direct reaction with a compound of Formulas 14, 15 or 16, or it can be obtained by subsequent chemical modification of a group which has been introduced by direct reaction, e.g., a substituent obtained by reduction, esterification, hydrolysis, dehydration or amidation of directly introduced groups. Chemical modification of the substituents can be effected by processes involving single or multiple steps. Substituents which are introduced by direct reaction are, for convenience, referred to as electrophilic groups and these groups form a preferred class of substituents. Thus, in this preferred group, X is a monovalent electrophilic group which is capable of bonding to carbon of a benzene nucleus by reaction of benzene or a substituted benzene (toluene, naphthalene) with an electrophilic reagent. These reagents are defined more fully in later paragraphs.

An electrophilic group, derivable from an electrophilic reagent, is deficient in electrons and has a point of low electron density. Electrophilic groups and reagents which are employed to effect substitution of such groups for the hydrogen on a carbon of a benzene nucleus are described in conventional textbooks of which the following are examples:

Remick, "Electronic Interpretations of Organic Chemistry," p. 53, 100–1, Wiley (1943).

Ingold, "Structure and Mechanism in Organic Chemistry," pp. 198–200, 269–304 (especially pp. 202, 211), Cornell University Press (1953).

Fuson, "Advanced Organic Chemistry," chap. 1, Wiley (1953).

Wheland, "Advanced Organic Chemistry," 2nd ed., p. 83, Wiley (1949).

The hydrocarbyl groups (R') in the definition of X above include alkyl, cycloalkyl, alkenyl, cycloalkenyl, aryl, alkaryl, arylalkyl, and the like of at most 18 carbons.

*Group Z.*—This group can be a sulfide in which the divalent sulfur is singly bonded to $R^2$ groups, a sulfone in which the hexavalent sulfur is bonded to each of two oxygens through double bonds and to R' groups through single bonds, a phosphine in which the trivalent phosphorus is bonded through single bonds to R' groups, a tertiary amine, an amide of a carboxylic acid, an organic nitrile (i.e., a compound bearing a —CN group), or a carbon monoxide group (CO).

All of the above classes of Z groups have the common property of acting as Lewis bases, i.e., compounds which have within their structure an atom which is capable of donating an electron pair to the boron cage to form a stable covalent bond. Lewis bases are a class of compounds which are defined in well known textbooks, e.g., Moeller, "Inorganic Chemistry," p. 326, Wiley (1954) and Wheland, "Advanced Organic Chemistry," pp. 80–81, Wiley (1949).

The group Z in the compounds of the invention, if present, is considered to be coordinately bonded to the boron cage largely through two electrons both of which are initially contributed by the Z group.

It should be noted that the introduction of Z groups into a decaborate or dodecaborate cage modifies the ionic charge which is inherent in these boron moieties. To illustrate, each of the decahydrodecaborate and dodecahydrododecaborate groups bears an ionic charge (or valence) of —2. With the introduction of one Z group into a polyhydropolyborate unit, the ionic charge of the group becomes −1, and with the introduction of two Z groups the ionic charge on the unit becomes 0, i.e., the polyhydropolyboron unit is electrically neutral. In contrast to the influence of the Z group on valence, as described above, the introduction of X groups onto the boron cage moieties has no effect on the ionic charge which is inherent in the boron cage structure. As noted earlier, the Z and X groups may have substituents with ionizable groups which are considered to be independent of the charge inherent in the boron cages.

The composition of the organic radicals which may be part of the Z groups is not critical and these radicals can have a wide range of structures. The hydrocarbyl radicals in the sulfides, sulfones, amines, phosphines, carboxylic amides and nitriles can be aliphatic, cycloaliphatic, or aromatic. Functional or reactive groups can be present in the $R^2$ radicals, i.e., groups which can take part in conventional chemical reactions, e.g., addition, condensation or polymerization reactions. Illustrations of reactive substituents which can be present on the Z groups are carboxyl, hydroxyl, halogen, amine, nitro and similar functional groups.

Examples of sulfides which are within the scope of Z are as follows: dimethyl sulfide, diethyl sulfide, dipropyl sulfide, dibutyl sulfide, di(2-ethylhexyl) sulfide, didodecyl sulfide, ethyl octadecyl sulfide, butyl dodecyl sulfide, dicyclohexyl sulfide, di(4-dodecylcyclohexyl) sulfide, ethyl cyclohexyl sulfide, methyl cyclopentyl sulfide, methyl (4-methylcyclohexyl) sulfide, methyl decahydronaphthyl sulfide, pentamethylene sulfide, di(β-aminoethyl) sulfide, di(β-cyanoethyl) sulfide, di(4-carboxyphenyl) sulfide, di(4-aminocyclohexyl) sulfide, di(ω-chlorobutyl) sulfide, di(4-cyanophenyl) sulfide, di(4-nitrophenyl) sulfide, di(2,4-diaminocyclohexyl) sulfide, (2,4-diaminophenyl)(4-aminocyclohexyl) sulfide, di(4-hydroxyphenyl) sulfide, di(8-hydroxynaphthyl) sulfide, and the like.

Examples which are illustrative of sulfones are methyl ethyl sulfone, dibutyl sulfone, dicyclohexyl sulfone, ethyl decahydronaphthyl sulfone, dioctyl sulfone, dioctadecyl sulfone, di(2-ethylhexyl) sulfone, diallyl sulfone, ethyl phenyl sulfone, cyclohexyl phenyl sulfone, and the like.

Examples which are illustrative of phosphines and amines are trimethylphosphine, triethylphosphine, cyclohexyldimethylphosphine, dodecyldiethylphosphine, trioctylphosphine, trimethylamine, tripropylamine, triisopropylamine, trioctylamine, tridodecylamine, trioctadecylamine, dihexylmethylamine, tricyclohexylamine, cyclohexyldiethylamine, triethylamine, methyldiethylamine, ethyldidodecylamine, cyclohexyldibutylamine, methyldicyclohexylamine, triallylamine, allyldimethylamine, N-methylpiperidine, N-methylpyrrole, pyridine, quinoline, isoquinoline, picolinic acid, N-isobutylpyrrolidine, N-ethylpyrrolidine, and the like.

Examples of amides which are within the scope of the Z group are formamide, acetamide, butyramide, 2-ethylhexenamide, stearamide, propiolamide, N,N-dimethylformamide, N,N-diethylformamide, N,N-dioctylformamide, N,N-dimethylacetamide, N-methyl-N-cyclohexylacetamide, N,N-dimethylbenzamide, N,N-dibutyltoluamide, N-acetylpiperidine, N-acetylpyrrolidine, N-octyl-2-pyrrolidone, N-cyclohexyl-2-pyrrolidone, and the like.

Examples of nitriles which are illustrative of and are within the scope of Z are propionitrile, capronitrile, valeronitrile, cyclohexanecarbonitrile, benzonitrile, toluonitrile, stearonitrile, and the like.

Examples of products containing substituted sulfide Z groups include:

$Na_3B_{10}H_8[S(C_{18}H_{37})_2]C(O)B_{10}H_8COOH$
$K_3B_{10}H_8[S(CH_2CHF_2)_2]C(O)B_{12}Cl_{10}NH_2$
$Li_3B_{10}H_8[S(CH_2CHCl_2)_2]C(O)B_{12}H_{10}NCO$
$Cs_3B_{12}H_{10}[S(CH_2CH_2CHBrCH_2Br)_2]C(O)B_{10}H_8COOH$
$BaB_{10}H_7[C_2H_5SC_{18}H_{35}]_2C(O)B_{10}H_8NH_2$
$CaB_{10}H_7[S(CH_2CH_2CN)_2]_2C(O)B_{10}H_8COOH$
$MgB_{10}H_7[S(CH_2CH_2OH)_2]_2CO_7B_{12}H_{10}NH_2$
$SrB_{12}H_9[S(C_6H_4OH_2]_2C(O)B_{10}Cl_8COOH$
$Tl_2B_{10}HCl_5(SCH_3)[S(C_3H_6NO_2)_2]_2C(O)B_{10}H_8NH_2$
$[(CH_3)_4N]_2B_{12}Cl_9[S(C_2H_4COOH)_2]_2C(O)B_{10}Br_8COOH$
$(NH_4)_2B_{10}H_7[S(C_2H_4COONa)_2]_2C(O)B_{10}Br_8COONa$
$(NH_4)_2B_{10}H_7[S(C_2H_4COONH_4)_2]_2C(O)B_{12}H_{10}NH_2$
$(C_2H_5NH_3)_2B_{10}H_7[S(C_4H_8COONH_3C_2H_5)_2]_2C(O)B_{10}H_8COOH$
$[(CH_3)_4N]_2B_{10}Cl_7[S(C_2H_4CONHC_8H_{17})_2]_2C(O)B_{10}H_8NH_2$
$Co(NH_3)_6B_{12}Cl_7(SCH_3)_2[S(C_2H_5COOC_2H_5)_2]_2C(O)B_{10}H_8N(CH_3)_2$
$Na_2B_{10}H_5Cl(COOH)_2[S(C_4H_8CN)_2]_2C(O)B_{12}H_{10}COOH$
$MgB_{12}H_9[C_2H_5SC_2H_4CON(C_2H_5)_1]_2C(O)B_{10}H_8NH_2$
$[(CH_3)_3NH]_2B_{10}Cl_6CN[C_2H_5SC_4H_8NHC(O)NH_2]_2C(O)B_{10}H_8COOH$
$(NH_4)_2B_{10}H_5(CN)_2[C_4H_9SC_2H_4NHC(O)N(C_6H_5)_2]_2C(O)B_{10}Cl_8COOH$
$NH_4B_{10}Cl_4Br_3[S(C_5H_{10}NHCONHC_3H_5]_2C(O)B_{12}H_{10}(CO)$
$[(CH_3)_3S]B_{10}H_7[S(C_4H_8COOH)_2]_2C(O)B_{12}H_{10}(CO)$

A second preferred class of compounds of Formula 1 are products in which the Z group bears hydrocarbon substituents bonded to the nitrogen, sulfur or phosphorus, which hydrocarbon substituents are free of functional groups. This preferred group can be represented by the formulas $R'_2S$, $R'_2SO_2$, $R'_3P$, $R'_3N$, $HC(O)NR'_2$, $R'C(O)NR'_2$, and $R'CN$, wherein the R' groups, which can be alike or different, are hydrocarbon groups of up to 18 carbons and wherein two of the R' groups can be joined to form a divalent radical which forms a ring with the sulfur, phosphorus or nitrogen. These groups are preferred solely because of availability and good reactivity to form the compounds of Formula 1.

Hydrocarbon, as used above, includes alkyl, alkenyl, alkynyl, cycloalkyl, cycloalkenyl, aryl, alkaryl, and aralkyl. The aliphatic hydrocarbon groups have preferably at most two carbons joined by multiple bonds, i.e., at most one double or triple bond.

A third class of preferred compounds of Formula 1 are products in which Z is an amide selected from N,N-disubstituted formamides, N,N-disubstituted acetamides, and N-substituted-2-pyrrolidones. The amides have the formulas

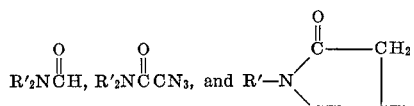

where R' is a hydrocarbon group as defined above.

Examples of representative and specific compounds are given below solely to illustrate the invention and they are not to be considered as limiting the scope of operable compounds:

$Na_4B_{10}H_9C(O)B_{10}H_9$, $Li_4B_{10}H_9C(O)B_{10}H_8COOH$,
$Cs_4B_{10}H_9C(O)B_{10}H_8NH_2$, $K_3HB_{10}H_9C(O)B_{10}Cl_8COOH$,
$(NH_4)_3HB_{10}Cl_9C(O)B_{10}H_8NH_2$,
$Zn_2B_{10}I_9C(O)B_{10}H_8COOH$,
$[(CH_3)_4N]_4B_{10}H_6(OCH_3)_3C(O)B_{10}Br_8COOH$,
$[(CH_3)_3S]_4B_{10}H_8(SCH_3)C(O)B_{10}H_6I_2NH_2$,
$(NH_2NH_3)_4B_{10}H_9C(O)B_{12}H_{10}COOH$,
$[(CH_3)_2NNH_3]_4B_{10}H_9C(O)B_{12}H_{10}NH_2$,
$(C_5H_5NH)_4B_{10}Br_9C(O)B_{12}Cl_{10}COOH$,
$[(C_2H_5)NH_3]_4B_{10}H_7(NH_2)_2C(O)B_{12}H_{10}NH_2$,
$Na_3B_{10}H_8[S(C_4H_9)_2]C(O)B_{10}H_8COOH$,
$[(CH_3)_4P]_3B_{10}Cl_8[S(C_6H_{11})_2]C(O)B_{12}Cl_{10}NCO$,
$Ag_3B_{10}H_6[C(O)CH_3]_2[N(CH_3)_3]C(O)B_{10}H_8N(C_2H_5)_2$,
$Cu_3[B_{10}H_8(CH_3CN)C(O)B_{10}H_9COOH]_2$,
$EuB_{10}H_6(C_2H_5)_2[CH_3C(O)N(CH_3)_2]C(O)B_{12}Cl_{10}NH_2$,
$Tl_3B_{10}Br_8[O_2S(C_2H_5)_2]C(O)B_{12}Cl_{10}COOH$,
$CuB_{10}H_7[S(CH_3)_2]_2C(O)B_{10}Cl_8NH_2$,
$Li_2B_{10}Cl_7[S(C_6H_{11})_2]_2C(O)B_{12}H_9(OCH_3)COOH$,
$(C_4H_9NH_3)_2B_{10}H_7[O_2S(C_6H_{11})_2]_2C(O)B_{12}Cl_{10}N(C_2H_5)_2$, $(C_2H_5NH_3)_2B_{10}H_7[P(C_2H_5)_3]_2C(O)B_{12}Br_{10}COOH$,
$NaB_{10}H_7[S(CH_3)_2]_2C(O)B_{10}H_8(CO)$,
$CsB_{10}H_5(OH)_2[S(CH_2C_6H_5)_2]_2C(O)B_{12}Cl_{10}(CO)$,
$(C_4H_9)_4PB_{10}F_7[O_2S(C_4H_9)_2]_2C(O)B_{12}Cl_6Br_4(CO)$,
$Zn(NH_3)_4B_{10}H_8[N(CH_3)_3]C(O)B_{12}H_{10}(CO)$,
$HgB_{10}Cl_8[C_5H_5N]C(O)B_{12}H_{10}(CO)$,
$Cs_2B_{10}H_7[S(CH_2CH_2OH)_2]_2C(O)B_{10}I_8COOH$,
$Hg_2B_{10}Cl_7[S(CH_3)(CH_2CH_2Br)]_2C(O)B_{12}Cl_{10}NH_2$,
$CdB_{10}H_6(C_4H_9)[S(CH_2CH_2COOH)_2]_2C(O)B_{10}H_6(SCH_3)_2COOH$,
$CuB_{10}H_6(NCO)[O_2S(C_2H_4C(O)OC_2H_5)_2]_2C(O)B_{10}Cl_7(OCH_3)NCO$,
$Na_4B_{12}H_{11}C(O)B_{12}H_{11}$, $K_4B_{12}H_{11}C(O)B_{12}H_{10}COOH$,
$Rb_4B_{12}H_{11}C(O)B_{12}H_{10}NH_2$, $Ba_2B_{12}I_{11}C(O)B_{12}H_{10}NCO$,
$[(CH_3)_4N]_3B_{12}H_{10}[S(CH_3)_2]C(O)B_{12}H_{10}COOH$,
$[(CH_3)_4P]_2B_{12}H_9[S(C_2H_5)_2]_2C(O)B_{12}Cl_{10}NH_2$,
$[(CH_3)_3S]_2B_{12}H_{10}[N(CH_3)_3]C(O)B_{12}H_{10}(CO)$,
$Co(NH_3)_6B_{12}Cl_{10}[N(CH_3)_3]C(O)B_{10}H_8COOH$,
and the like.

PROPERTIES OF THE NEW COMPOUNDS

*Physical properties.*—The new compounds are generally solid products which are stable at conventional atmospheric temperatures and pressure. The color of the products and many of their physical characteristics are determined in part by the cation M, by the substitutent X and by the group Z. Frequently the products are orange, yellow or colorless (white). They are crystalline and occasionally fluorescent.

Many of the compounds are soluble, at least to some extent, in water or hydroxylated solvents, e.g., alcohols. The compounds form ions in aqueous media and these solutions have excellent stability. The solutions conduct electricity and they can be used in electrochemical processes.

*Chemical properties.*—The compounds will readily undergo metathetic reactions to provide products having a wide range of M groups. To illustrate, a sodium salt, e.g., $Na_4B_{10}H_9C(O)B_{10}H_8COONa$, in aqueous solution is contacted with an acidic ion-exchange resin, to provide an aqueous solution of the acid $H_4B_{10}H_9C(O)B_{10}H_8COOH$. The acid solution can then be reacted with a broad range of bases (organic and inorganic) to provide salts with any desired cation M.

Compounds which bear hydrogen atoms bonded to one or both of the boron cages in the anion react smoothly with halogens to provide halogen-substituted products wherein the halogens are bonded to boron. Further, as noted earlier, the compounds react with known electrophilic reagents to obtain substituted products.

Infrared absorption spectra of the new compounds show that the carbonylic group in the anion [AC(O)A'] of Formula 1 is strongly polar; in fact, it is more polar than the —C(O)— group in aromatic organic compounds, e.g., benzophenone. The carbonylic group adds water readily, especially in acid solution, to form hydrates, i.e., compounds containing a gem-diol structure which can be illustrated for a non-substituted acid by the following formula:

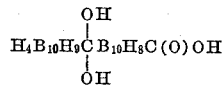

In the above compound one of the acid hydrogens is viewed as being closely associated with the gem-diol structure and it can then be written as follows:

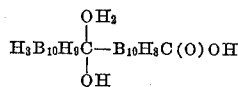

Similarly, the ammonium, substituted ammonium, hydrazonium and substituted hydrazonium salts, can be viewed as having a structure in which one of the basic nitrogen groups is associated closely with the carbonylic group. To illustrate, the ammonium salt can be written as follows:

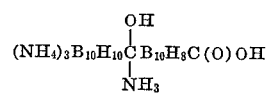

The above formulas represent optional structures which may be assigned to the compounds of the invention. They fall within the scope of the compounds of Formula 1 and are considered to be part of the invention.

In view of the polybasic character of the anions, the compounds may be neutral or acid salts, i.e., salts in which all or only part of the acidic protons are neutralized. Both neutral and acid salts are considered to be within the scope of the invention.

PREPARATION OF THE NEW COMPOUNDS

The new compounds are prepared by reacting the following:

(a) A bis(carbonyl)decaborane selected from compounds of the formulas $B_{10}H_{8-d}X_d(CO)_2$ and

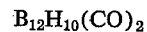

where X is defined as in Formula 1 and $d$ is a cardinal whole number of 0 to 8, and (b) A polyborate selected from compounds of the formulas $Ma(B_{10}H_{10-f}X_f)b$, $Ma(B_{12}H_{12-g}X_g)b$,

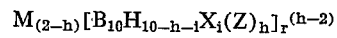

and $M_{(2-h)}[B_{12}H_{12-h-k}X_k(Z)_h]_r^{(h-2)}$, where M, X and Z are defined as in Formula 1, $a$ and $b$ are positive whole numbers which are determined by the valence of M, i.e., $a$ multiplied by the valence of M is equal to $2b$; $f$ is a cardinal number of 0 to 9, inclusive; $g$ is a cardinal number of 0 to 11, inclusive; $h$ is a cardinal number of 1 or 2; $i$ has a value of 0 to $(9-h)$, $k$ has a value of 0 to $(11-h)$; and $r$ has a value of at least 1 and is otherwise equal to the valence of M, i.e., $r$ is 1 when $h=2$ and when $h$ is 1, $r$ is the valence of M; $(2-h)$ represents the number of M groups and is 0 or 1; $(h-2)$ is the valence of the group in brackets and is 0 or $-1$.

The reactants in groups (a) and (b) are compounds whose preparations are not described fully in the literature. Procedures for their preparation, particularly for decaboranes and decarborates are described fully in U.S. Patents 3,148,938, 3,149,163, 3,148,939 and 3,166,378, issued to W. H. Knoth, Jr.; and in copending applications Ser. No. 237,392, filed Nov. 13, 1962; U.S. Patent 3,296,260 issued to W. H. Knoth, Jr.; Ser. No. 225,966, filed Sept. 21, 1962; and Ser. No. 186,270, filed Apr. 9, 1962, now abandoned and refiled as Ser. No. 324,885, on Nov. 19, 1963, all filed in the name of W. H. Knoth, Jr. The dodecaboranes and dodecaborates are prepared as described in U.S. 3,169,049 and U.S. 3,169,045 issued in the names of H. C. Miller and E. L. Muetterties, and in their application Ser. No. 38,099, filed June 23, 1960, now abandoned and refiled as Ser. No. 421,697 on Dec. 28, 1964, and Ser. No. 246,636, filed Dec. 21, 1962; by J. C. Sauer, Ser. No. 206,554, filed June 28, 1962; U.S. 3,265,737, U.S. 3,217,023 and U.S. 3,314,990 each in the name of N. E. Miller. The preparations of representative reactants in groups (a) and (b) are illustrated later.

The process described above leads to compounds of the invention bearing at least one carboxyl group as an X substituent. The products may be decarboxylated by methods similar to procedures employed in organic chemistry to provide products of the invention free of X groups. Alternatively, compounds free of X substituents can be obtained by reacting a member of group (b) above, for example $Na_2B_{12}H_{12}$ with a (monocarbonyl) polyhydroborane, e.g., $(CH_3)_4NB_{12}H_{11}CO$.

The reaction is readily conducted in conventional vessels with corrosion-resistant inner surfaces, e.g., glass, stainless steel, platinum, poly(tetrafluoroethylene) resin, and the like. The vessel is generally connected to a reflux condenser and is equipped with a means for heating.

The reaction vessel, optionally, is flushed with an inert gas, e.g., nitrogen, argon, helium, and the like to remove adventitious moisture and oxygen. This step is not essential for operability but it is helpful in assuring good yields of products.

The vessel is charged with the boron-containing reactants, i.e., the bis(carbonyl) and the polyborate, described earlier. A solvent or liquid reaction medium can be added to provide intimate contact between the reactants. A liquid medium is, however, not essential for operability. The reaction mass is generally heated gradually to the refluxing temperature of the liquid medium and it is maintained conveniently at this temperature for the duration of the reaction. The reaction mixture is preferably agitated by any convenient means during the operation.

Processing of the reaction mixture follows conventional procedures. In the event a liquid medium is present, the mixture is evaporated to remove the liquid. The residue is dissolved in an appropriate solvent, e.g., water, alcohols or other hydroxylated liquids, and a salt or base having a large cation is added, e.g., quaternary ammonium salts, thallium salts, cesium salts, trialkylsulfonium salts, and the like. Boron-containing salts of the large cations have relatively low solubility in water and precipitate when the solutions are cooled or concentrated. The products thus obtained are readily purified by conventional crystallization techniques.

Many variations in the processing operations can be employed. To illustrate, the residue from the reaction mixture can be dissolved in water and the aqueous solution can be contacted with an acidic ion-exchange resin to obtain a solution of the boron-containing acid. This solution can be neutralized with any appropriate base and the neutral solution can be evaporated to obtain the salt in pure form, which frequently contains water of crystallization.

The mole ratios in which the reactants are employed is not a critical factor in the process. The ratio of moles bis(carbonyl)/moles polyborate can lie between about 0.1 and 10; preferably, the ratio lies between about 0.5 and 2.5. The reaction mechanism is not fully understood. The reaction product, as isolated, represents usually a combination of the two components in equimolar ratios.

The temperature at which the reaction is conducted is not critical. Satisfactory operation is generally found within a temperature range of about 25° C. to 175° C.; preferably, a temperature range of about 40° C. to 125° C. is employed. The reaction is sometimes mildly exothermic when the components are mixed initially and, in the event a temperature rise occurs, it can be controlled by means of cooling media, e.g., ice, mixtures of ice and water, solutions of solid carbon dioxide and other well-known methods.

The pressure at which the process is operated is not critical. Atmospheric pressure is satisfactory and it is the pressure most conveniently employed. However, the pressure can be subatmospheric or superatmospheric, in the event it is more convenient to operate under these conditions, e.g., the pressure can lie between about 0.1 atmosphere and 10 atmospheres.

As noted earlier, a liquid medium can be employed with the reactants. The medium need not be a solvent for both of the reactants although it is advantageous to employ a medium which dissolves one or both of the reactants. Liquid media are employed which are inert to the reactants. Suitable liquids which can be employed include nitriles (e.g., acetonitrile, propionitrile, butyronitrile, and benzonitrile), N,N - dihydrocarbylsulfonamides (e.g., N,N-diethylsulfonamides, N,N - diethylcyclohexanesulfonamide, etc.), aromatic hydrocarbons (e.g., benzene and toluene), and ethers (e.g., dibutyl ether, 1,2-dimethoxyethane, and others). Nitriles and ethers are preferred as solvents.

The reaction proceeds rapidly and the time in which the reactants are in contact is not a critical factor. For a batch process, the time can lie between about 5 minutes and 24 hours. A continuous flow process can be employed wherein the reactants are fed continuously into one end of a reaction zone and maintained in contact for a brief period, e.g., 0.1–0.5 second, with very efficient mixing and the reaction mixture containing the desired product is discharged continuously from the exit end of the tube.

In the process as described above, reactants can be employed which are unsubstituted or which can bear substituents designated as X in Formulas 1, 3 and 4. The process is generic for the preparation of compounds of the invention from both substituted and unsubstituted reactants.

The compounds of the invention are very stable products and the unsubstituted or partially substituted products will undergo the substitution reactions, e.g., with electrophilic reagents, in the manner described earlier. Thus, the products of the invention can be halogenated, nitrated, acylated, carboxylated, aminated, and the like in a manner resembling carbocyclic aromatic compounds. The substituent groups can be introduced directly, e.g., halogen, or indirectly, e.g., amine, isocyanato, and the like. The procedures which are employed are the same as described in assignee's copending application, referred to in an earlier paragraph, particularly Ser. No. 237,392, filed Nov. 13, 1962 by W. H. Knoth, Jr., Ser. No. 246,636, filed Dec. 21, 1962 by H. C. Miller and E. L. Muetterties, and U.S. Patent 3,296,260 by W. H. Knoth, Jr.

The following examples illustrate further the compounds of the invention and their preparation. Methods for preparing the reactants which are employed to obtain the novel compounds are described in Examples A through E.

*Example A*

PREPARATION OF SALTS OF $B_{10}H_{10}^{-2}$

A reaction vessel having a capacity of about 365 g. of water is charged with 0.79 g. of decaborane(14), cooled in liquid nitrogen, and then evacuated to a pressure of 10 microns of mercury. Approximately 21 g. of dimethyl sulfide is condensed onto the decaborane in the reaction vessel. The reaction vessel is closed, allowed to warm to room temperature and stand for 4 days. During this time, 6.6 millimoles of hydrogen is evolved. The reaction vessel is opened and excess dimethyl sulfide is removed by distillation, leaving a practically quantitative yield of white solid residue of $B_{10}H_{12} \cdot 2(CH_3)_2S$, also written as $B_{10}H_{12}[S(CH_3)_2]_2$. The compound is recrystallized from ethyl acetate and it melts at 122–124° C. The compound is called bis(dimethyl sulfide)decaborane(12).

Bis(dimethyl sulfide)decaborane(12) (8.5 g.) is mixed with 50 ml. of liquid ammonia and stirred in a round-bottom reaction vessel for 1 hour with the vessel being cooled to a temperature of about −50° C. by partial immersion in a bath of a mixture of solid carbon dioxide and acetone. The cooling bath is then removed and the excess ammonia is allowed to evaporate with stirring. The remaining traces of ammonia are removed by subjecting the residue to a high vacuum (0.01 mm. of mercury) at 25° C. There is obtained 5.6 g. of solid residue which is virtually a quantitative yield of $(NH_4)_2B_{10}H_{10}$.

An aqueous solution of 40 g. of $(NH_4)_2B_{10}H_{10}$ is passed through a column filled with a commercial acidic ion-exchange resin of the crosslinked polystyrenesulfonic acid type. The aqueous effluent which is a solution of $H_2B_{10}H_{10}$ [or, in hydronium form, $(H_3O)_2B_{10}H_{10}$] is evaporated partially to about half its volume and an aqueous solution of $(CH_3)_4NOH$ is added to the concentrated solution. A white precipitate forms which is separated by filtration, washed and dried to obtain $[(CH_3)_4N]_2B_{10}H_{10}$ as a white crystalline solid. It is purified by recrystallization from hot water.

Example B

PREPARATION OF $B_{10}H_8(CO)_2$

Two solutions are prepared consisting of (1) 65 ml. of water and 18 g. of $NaNO_2$, and (2) 200 ml. of water containing 20 g. of $(NH_4)_2B_{10}H_{10}$. Both solutions are chilled to below 15° C. and they are combined. A solution (65 ml.) of 12% hydrochloric acid is chilled to below 15° C. and added to the combined solution with stirring and cooling to keep the temperature low. The dark reaction mixture is filtered and excess zinc and hydrochloric acid is added to the filtrate. The solid which forms, and unreacted zinc, are separated by filtration and the crude solid is extracted with ethanol to separate the boron compound from zinc. The ethanol extract is diluted with water and the solid which forms is separated by filtration to obtain 1.8 g. of $B_{10}H_8(N_2)_2$. The process is repeated to obtain a further quantity of the bis(diazonium) compound.

A glass-lined, stainless steel pressure vessel (capacity, 100 ml.) is charged with 4.2 g. of $B_{10}H_8(N_2)_2$ and 50 ml. of iron carbonyl. The vessel is pressured with carbon monoxide, heated at 140° C. for 1.5 hours at 1000 atmospheres pressure, and cooled. The reaction mixture is filtered and the filtrate is evaporated. The residue is dissolved in benzene, the solution is filtered and the filtrate is evaporated to obtain 2.5 g. of $B_{10}H_8(CO)_2$. The product is purified by sublimation at 80–120° C./0.1 mm.

PREPARATION OF $B_{10}Cl_8(CO)_2$

A solution is prepared consisting of 2 g. of $B_{10}H_8(CO)_2$ in 50 ml. of water. The solution is cooled in an ice bath and chlorine is bubbled into the solution for 45 minutes. The cooling bath is removed and passage of chlorine is continued for 3 hours at atmospheric temperature (ca 25° C.). The reaction mixture is evaporated and the residue, which is hydrated $H_2B_{10}Cl_8(COOH)_2$ is sublimed at 140° C. and 0.1 mm. pressure to give a crystalline solid. The solid is resublimed at 300° C. and atmospheric pressure to obtain pure crystalline $$B_{10}Cl_8(CO)_2$$

Example C

PREPARATION OF $B_{10}H_8[S(CH_3)_2]_2$ AND $(CH_3)_4NB_{10}H_9[S(CH_3)_2]$

A glass reaction vessel, equipped with a stirrer and immersed in an ice bath, is charged with a solution of 40 g. of $(NH_4)_2B_{10}H_{10}$ in 20 ml. of $(CH_3)_2SO$. The solution is stirred and cooled while hydrogen chloride gas is passed through it for 1.5 hours at a rate sufficient to maintain the temperature at 44–65° C. At the end of this period, the reaction mixture is poured into 500 ml. of water and solid $B_{10}H_8[S(CH_3)_2]_2$ precipitates. The product is separated and recrystallized from acetone-water solution several times. It melts at 265–266° C.

The filtrate is extracted three times with 100 ml. portions of ethyl ether and the aqueous liquid which remains is concentrated under reduced pressure to a volume of about 200 ml. The liquid is filtered to separate a white solid which is a mixture of $NH_4Cl$ and a polyhydropolyborate. The solid is dissolved in water and an aqueous solution of $(CH_3)_4NCl$ is added. The precipitate which forms is separated and recrystallized from water to obtain pure $(CH_3)_4NB_{10}H_9[S(CH_3)_2]$.

Example D

PREPARATION OF SALTS OF $B_{12}H_{12}^{-2}$

A pressure vessel of 400 ml. capacity is charged with 9.5 g. of $NaBH_4$ and 75 ml. of 1,2-dimethoxyethane (glyme). The vessel is closed, cooled to −80° C. and evacuated to a pressure of about 0.001 mm. of mercury. Diborane (14.0 g.) is charged into the vessel which is then sealed and heated with agitation under autogenous pressure for 10 hours at 120° C. The reactor is cooled, the volatile products are released by venting and the contents of the tube are washed into a receiver with glyme.

A suspension of a white solid in a yellow liquid is formed from which the solid is separated by filtration. The solid is dissolved in hot tetrahydrofuran and the solution is filtered to remove a trace of unreacted $NaBH_4$. The hot filtrate is diluted with glyme and chilled to yield 14.0 g. of solvated $Na_2B_{12}H_{12}$ as long, glistening white needles. The compound has the formula $$Na_2B_{12}H_{12} \cdot 0.89 C_4H_{10}O_2 \cdot 0.56 H_2O$$

An aqueous solution of the above disodium salt is passed through a column filled with a commercially available acid ion-exchange resin of the crosslinked polystyrene-sulfonic acid type. The aqueous effluent is a solution of the acid $H_2B_{12}H_{12}$, or in its hydronium form $$(H_3O)_2B_{12}H_{12}$$

A portion of the aqueous solution is evaporated under reduced pressure to obtain a white crystalline solid which is the acid, $H_2B_{12}H_{12}$, containing water of crystallization (ca. 7 moles). The acid has the approximate formula $(H_3O)_2B_{12}H_{12} \cdot 5H_2O$. It can be obtained with more or less water of crystallization by change in the length of drying time.

A portion of the acidic aqueous effluent is neutralized with ammonium hydroxide and the neutralized solution is evaporated to dryness to obtain a white crystalline product which is $(NH_4)_2B_{12}H_{12}$. The product is dried thoroughly under reduced pressure to remove water of crystallization.

Example E

PREPARATION OF $B_{12}H_{10}(CO)_2$

A pressure vessel (400 ml. capacity) is charged with 20 g. of $H_2B_{12}H_{12}$ containing about 7 moles of water per mole of $H_2B_{12}H_{12}$, sealed and evacuated. The pressure vessel is agitated, heat is applied cautiously, and carbon monoxide is admitted under pressure in several stages until a temperature of 80° C. and a pressure of 1000 atmospheres is reached. The vessel is agitated for 5 hours at 80° C. and 975–1000 atmospheres, repressuring with CO as necessary. After the heating period is completed, the vessel is cooled and unreacted carbon monoxide is removed by venting the vessel. A semisolid residue remains in the vessel.

A portion of the semisolid residue is dried under reduced pressure in a sublimation apparatus and the dried material is heated at 100° C. and 1 mm. Hg pressure. A crystalline sublimate is collected which is $B_{12}H_{10}(CO)_2$.

A second portion of the semisolid residue is dried at 25° C. and 1 mm. Hg pressure in the presence of $P_2O_5$. The dried residue is extracted with hot benzene and the extract is cooled. White, crystalline $B_{12}H_{10}(CO)_2$ separates and it is removed by filtration.

Example 1

A. A reaction vessel is charged with 5.0 g. of $$(NH_4)_2B_{10}H_{10}$$

4.0 g. of $B_{10}H_8(CO)_2$ and 100 ml. of acetonitrile. The mixture is stirred and heated to refluxing for about 18 hours to form a clear orange solution. The solution is evaporated under a stream of air until a viscous oil remains. The oil is dissolved in 100 ml. of water and a saturated aqueous solution of 15 g. of $(CH_3)_4NCl$ is added with stirring. A yellow solid forms which is separated by filtration and recrystallized from 150 ml. of water. The product (9.1 g.) is an acid salt of the formula $$[(CH_3)_4N]_3(H_3O)B_{10}H_9C(O)B_{10}H_8C(O)OH$$

Its identity is confirmed by the infrared absorption spectrum.

B. A portion of the acid tetramethylammonium salt obtained in Part A is dissolved in water and the solution is passed through a column filled with an acid ion-exchange resin of the crosslinked polystyrenesulfonic acid type. The titration curve of the aqueous effluent, which is a solution of hydrated $H_4B_{10}H_9C(O)B_{10}H_8C(O)OH$, shows three inflection points corresponding to three strongly acidic hydrogens, one moderately acidic hydrogen and one weakly acidic hydrogen (in the —COOH group). These inflection points represent formation of the following compounds during neutralization of the acid:

$$Na_3HB_{10}H_9C(O)B_{10}H_8C(O)OH$$
$$Na_4B_{10}H_9C(O)B_{10}H_8C(O)OH$$

and $$Na_4B_{10}H_9C(O)B_{10}H_8C(O)ONa$$

Each of the above salts can be isolated as a hydrate, if desired, by evaporation of the solution at the appropriate stage in the titration.

C. A reaction vessel is charged under nitrogen with 2.0 g. of $B_{10}H_8(CO)_2$, 5 g. of $[(CH_3)_4N]_2B_{10}H_{10}$ and 50 ml. of acetonitrile. The mixture is heated to refluxing in the nitrogen atmosphere for 75 minutes. It is cooled and filtered to remove unreacted $[(CH_3)_4N]_2B_{10}H_{10}$ (2.0 g.). The orange-colored filtrate is partially evaporated and filtered to separate 1.4 g. of a solid product (designated A). The filtrate is again partially evaporated and filtered to separate 2.0 g. of a second solid product (designated B). The final filtrate is evaporated to dryness to yield a gummy residue (designated C). The infrared absorption spectra of these products shows that they are mixtures of $$[(CH_3)_4N]_3B_{10}H_9C(O)B_{10}H_8(CO)$$

and $$[(CH_3)_4N]_3HB_{10}H_9C(O)B_{10}H_8C(O)OH$$

The latter compound contains water of hydration and can be written as $$[(CH_3)_4N]_3(H_3O)B_{10}H_9C(O)B_{10}H_8C(O)OH$$

to show association of water with the acidic proton to form the hydronium ion.

Fraction B, from above, is dissolved in hot water and the solution is cooled to precipitate a yellow crystalline fluorescent solid. The solid is separated by filtration and the yellow filtrate is set aside. The solid product is washed and dried to obtain a monohydrated acid salt of the formula $$[(CH_3)_4N]_3H[B_{10}H_9C(O)B_{10}H_8C(O)OH]$$

Analysis calc'd for $$[(CH_3)_4N]_3(H_3O)B_{10}H_9C(O)B_{10}H_8C(O)OH:$$

B, 39.5; C, 30.7; H, 10.5; N, 7.7. Found: B, 40.3; C, 29.9; H, 10.5; N, 7.8.

D. A solution of 10 g. of $Cs_2B_{12}H_{11}COOH \cdot H_2O$ in about 300 ml. of water is passed through a column filled with a strong acid ion-exchange resin of the cross-linked polystyrenesulfonic acid type. The effluent, which is a solution of $H_2B_{12}H_{11}COOH$, is diluted to 500 ml. with water. Sufficient aqueous $(CH_3)_4NOH$ is added to 475 ml. of this solution to form a solution of $$(CH_3)_4N(H_3O)B_{12}H_{11}COOH$$

The solution is evaporated to dryness on a steam bath and a white crystalline solid is obtained which is $$(CH_3)_4NB_{12}H_{11}CO$$

A solution consisting of 4.4 g. of $(CH_3)_4NB_{12}H_{11}CO$, 3.85 g. of $(NH_4)_2B_{10}H_{10}$ and 100 ml. of $CH_3CN$ is refluxed 21–22 hours, cooled and filtered. The clear yellow filtrate is evaporated in a stream of air at atmospheric temperature to obtain a semi-solid yellow residue. The major portion of this product is dissolved in water and sufficient aqueous 10% sodium hydroxide solution is added to make the mixture basic. Approximately one-half of the basic solution is taken for further processing. It is reacidified with hydrochloric acid and mixed with an ethanolic solution of $(CH_3)_4NCl$. The light yellow solid which precipitates is separated and it contains the tris(tetramethylammonium) acid salt of the anion of Formula 15, i.e., $[(CH_3)_4N]_3(H_3O)[B_{10}H_9C(O)B_{12}H_{11}]$.

The tris(tetramethylammonium) acid salt obtained in Part C is soluble in water and the aqueous solution can be passed through a column filled with a commercial acidic ion-exchange resin of the crosslinked polystyrenesulfonic acid type. The aqueous effluent is a solution of $$H_4B_{10}H_9C(O)B_{10}H_8C(O)OH$$

Evaporation of the above solution to dryness will yield the acid, generally with water of crystallization.

The aqueous solution of the acid obtained above can be neutralized with a broad range of bases, oxides, or simple salts to obtain additional novel salts of the anion. To illustrate, the aqueous solution can be neutralized with pyridine to obtain $(C_5H_5NH)_4B_{10}H_9C(O)B_{10}H_8COOH$, with $$(CH_3)_3SOH$$

to obtain $[(CH_3)_3S]_4B_{10}H_9C(O)B_{10}H_8COOH$, with $$(C_2H_5)_4POH$$

to obtain $[(C_2H_5)_4P]_4B_{10}H_9C(O)B_{10}H_8COOH$, with triethanolamine to obtain $$[(HOCH_2CH_2)_3NH]_4B_{10}H_9C(O)B_{10}H_8COOH$$

with glycine to obtain $$[(HO(O)CCH_2NH_3]_4B_{10}H_9C(O)B_{10}H_8COOH$$

with hydrazine hydrate to obtain $$(NH_2NH_3)_4B_{10}H_9C(O)B_{10}H_8COOH$$

with ammoniacal $ZnCl_2$ to obtain $$[Zn(NH_3)_4]_2B_{10}H_9C(O)B_{10}H_8COOH$$

with $Eu_2O_3$ to obtain $Eu_4[B_{10}H_9C(O)B_{10}H_8COOH]_3$, with $Ag_2O$ to obtain $Ag_4B_{10}H_9C(O)B_{10}H_8COOH$, with $HgCl_2$ to obtain $Hg_2B_{10}H_9C(O)B_{10}H_8COOH$, and the like. The above illustrations are not limiting and serve solely to demonstrate the broad scope of metathetic reactions which can be conducted, not only with the compound of Example 1, but with acids derived from the compounds of the examples which follow.

In the formulas used in Example 1, the hydrogen ion is represented simply as H or, in its hydrated form, as $(H_3O)$, i.e., the hydronium ion. The hydrogen ion and hydronium ion are used interchangeably and are not intended to represent distinct and separate compounds. The terms, "hydrogen ion" and "hydronium ion" are used herein according to the definitions given on page 26 of "Nomenclature of Inorganic Chemistry—International Union of Pure and Applied Chemistry," published by Butterworths Scientific Publications (1957), London.

*Example 2*

The filtrate from recrystallization of Fraction B of Example 1, Part C, is mixed with hydroxylamino-O-sulfonic acid. The yellow color disappears and, upon chilling the solution, a colorless (white) solid precipitates which is separated, washed and dried to obtain a compound which can be written as $$[(CH_3)_4N]_2(NH_4)H[B_{10}H_9C(O)B_{10}H_8NH_2]$$

The acidic proton is associated closely with the —$NH_2$ group and the compound can also be represented as $$[(CH_3)_4N]_2(NH_4)[B_{10}H_9C(O)B_{10}H_8NH_3]$$

Analysis calc'd for $$[(CH_3)_4N]_2(NH_4)H[B_{10}H_9C(O)B_{10}H_8NH_2]$$

B, 48.6; C, 24.3; H, 10.9; N, 12.6. Found: B, 48.6; C, 24.1; H, 10.7; N, 12.3.

*Example 3*

The product obtained in Example 9, Part B, is heated at 220° C. for 1 hour under very low pressure (less than 0.1 mm. Hg). It is cooled, mixed with 150 ml. of acetonitrile and then with 1.0 g. of $NaN_3$. The mixture is stirred for about 48 hours and it is then filtered. The filtrate is evaporated and the residue is stirred with water to form a mixture of solid and liquid. The solid is separated by filtration and it is recrystallized from water to obtain the monohydrate of $[(CH_3)_4]_3HB_{10}H_9C(O)B_{10}H_8NCO$ in which the water is associated with the acidic proton to form the hydronium ion, $H_3O^+$. The identity of the compound is confirmed by elemental analysis.

Analysis calc'd for $[(CH_3)_4N]_3(H_3O)B_{10}H_9C(O)B_{10}H_8NCO$

B, 39.7; C, 30.8; H, 10.4; N, 10.3. Found: B, 42.7; C, 28.8; H, 10.2; N, 10.2

*Example 4*

A reaction vessel is flushed with nitrogen to remove the air and to provide an inert atmosphere. The vessel is charged with a solution of 4.0 g. of $B_{10}Cl_8(CO)_2$ in 100 ml. of acetonitrile and 6.0 g. of $[(CH_3)_4N]_2B_{10}H_{10}$ is added with stirring. The solution becomes orange-red in color and the temperature rises to 30° C. The mixture is refluxed for 3 hours under the nitrogen atmosphere. It is cooled and filtered to separate 1.9 g. of unreacted $[(CH_3)_4N]_2B_{10}H_{10}$ The filtrate is concentrated under a stream of air to about half its original volume. Sufficient aqueous solution of $(CH_3)_4NCl$ is now added to bring the solution to about four times its original volume. An orange gum forms which is separated and dissolved in aqueous 5% sodium hydroxide. Solid $(CH_3)_4NCl$ (5.0 g.) is added to the solution and hydrochloric acid is added until the solution is acid. A bright orange solid precipitates which is separated by filtration, washed thoroughly with water and dried. The compound is a hydrated acid salt of the tetravalent anion $B_{10}H_9C(O)B_{10}Cl_8COOH^{-4}$.

Analysis calc'd for $[(CH_3)_4N]_3(H_3O)B_{10}H_9C(O)B_{10}Cl_8C(O)OH$

B, 26.3; C, 20.4; H, 6.0; N, 5.1; Cl, 34.4. Found: B, 28.1; C, 19.1; H, 6.1; N, 5.2; Cl, 35.1.

*Example 5*

A. A reaction vessel is charged with 2.0 g. of $[(CH_3)_4N]_3(H_3O)B_{10}H_9C(O)B_{10}H_8C(O)OH$ (obtained in Example 1, Part C) and 40 ml. of acetonitrile. The reaction mixture is cooled in an ice bath and chlorine is bubbled through it. The temperature rises initially to 28° C. and then drops to 15° C. At this point the cooling bath is removed and chlorine flow is continued while the clear orange solution warms slowly to atmospheric temperature (ca. 25° C.). Passage of chlorine is continued for 1 hour at atmospheric temperature. The solution is now evaporated to dryness under a stream of air to obtain a solid residue (Fraction A).

The major portion of Fraction A is mixed with 160 ml. of water containing 1 g. of tetramethylammonium chloride, heated and filtered to remove an insoluble portion. The filtrate is cooled and the crystals which form are separated, washed and dried. The insoluble portion is recrystallized from 80 ml. of water to obtain a product whose infrared absorption spectrum is identical with the earlier product. The two fractions are combined to obtain 1.8 g. of $[(CH_3)_4N]_4B_{10}Cl_9C(O)B_{10}Cl_8C(O)OH$. The compound is yellow and slightly fluorescent. The ultraviolet absorption spectrum of a solution of the compound in acetonitrile provides the following data: $\lambda_{max.}$, 335 m$\mu$ ($\epsilon$=445); 272 m$\mu$ ($\epsilon$=11,100); 242 m$\mu$ ($\epsilon$=18,400); 221 m$\mu$ ($\epsilon$=16,400). The infrared spectrum shows characterizing sharp absorption bands at 6.0 and 6.5$\mu$.

Analysis calc'd for $[(CH_3)_4N]_4B_{10}Cl_9C(O)B_{10}Cl_8C(O)OH$

B, 18.4; C, 18.2; H, 4.2; N, 4.7; Cl, 50.7. Found: B, 18.4; C, 18.8; H, 4.4; N, 4.4; Cl, 49.7.

The remaining portion of the residue, identified above as Fraction A, is dissolved in aqueous sodium hydroxide solution and reprecipitated by addition of hydrochloric acid. The product is separated, washed and dried to obtain the hydrated acid salt $[(CH_3)_4]_3(H_3O)B_{10}Cl_9C(O)B_{10}Cl_8C(O)OH$ The identity of the compound is confirmed by its infrared absorption spectrum which shows a characteristic absorption band at 5.95$\mu$.

B. A solution is prepared containing approximately 1.0 g. of $[(CH_3)_4N]_3(H_3O)B_{10}H_9C(O)B_{10}Cl_8C(O)OH$ in acetonitrile. Chlorine gas is bubbled into the solution at atmospheric temperature (ca. 25° C.) for about 5 minutes. The solution is filtered and the filtrate is passed into an aqueous solution of $(CH_3)_4NCl$. A solid precipitates which is separated by filtration, washed and dried. It is $[(CH_3)_4N]_4B_{10}Cl_9C(O)B_{10}Cl_8C(O)OH$ The identity of the compound is confirmed by its infrared absorption spectrum.

Examples 1 to 5 illustrate generically compounds of the invention and their preparation, in which the anion, AC(O)A', of Formula 1 is tetravalent and in which A and A' are each decaborate groups. The examples also illustrate novel compounds bearing representative substituents (or X groups) on the boron cage units, e.g., —Cl, —C(O)OH, —NH$_2$ and —NCO.

*Example 6*

A. A mixture consisting of 4.0 g. of $(NH_4)_2B_{10}H_{10}$, 1.4 g. of $B_{12}H_{10}(CO)_2$, and 50 ml. of anhydrous acetonitrile is refluxed for 6 hours. It is cooled and the solution is evaporated under a stream of air until a viscous residue remains. The residue is dissolved in 30 ml. of water and to this solution there is added with stirring a concentrated aqueous solution of 8.2 g. of $(CH_3)_4NCl$. The solid which precipitates is separated and it is dissolved in aqueous NaOH solution. An aqueous solution of $(CH_3)_4NCl$ is again added with stirring and the mixture is filtered through diatomaceous filter-aid to obtain a clear filtrate. The filtrate is acidified with aqueous hydrochloric acid and the orange solid which precipitates is separated by filtration. The solid is crystallized from 150 ml. of water containing 2.5 g. of $(CH_3)_4NCl$ to give 1.5 g. of $[(CH_3)_4N]_3(H_3O)B_{10}H_9C(O)B_{12}H_{10}COOH$ The ultraviolet absorption spectrum of the compound in aqueous solution is as follows: $\lambda_{max.}$, 341 m$\mu$ ($\epsilon$=16,400); 214 m$\mu$ ($\epsilon$=13,900).

Analysis calc'd for above formula: B, 41.6; C, 29.4; H, 10.4; N, 7.4. Found: B, 44.6; C, 27.7; H, 10.1; N, 8.9, 8.4.

B. The product of Part A is dissolved in hot water and $H_2NOSO_3H$ is added. The mixture is stirred for a short time and then cooled. A white crystalline product separates which is isolated from the mixture, washed and dried. The product is the compound $[(CH_3)_4N]_2(NH_4)HB_{10}H_9C(O)B_{12}H_{10}NH_2$ The acidic hydrogen is closely associated with the —NH$_2$ substituent and the compound can be viewed as having the structure $[(CH_3)_4N]_2(NH_4)B_{10}H_9C(O)B_{12}H_{10}NH_3$ C. A mixture of 10 g. of $Na_2B_{12}H_{12} \cdot 2H_2O$ and 400 ml. of 1,2-dimethoxyethane (glyme) is heated to boiling under nitrogen gas and heating is continued until approximately one-half of the glyme is distilled. Water of hydration is removed in this step. Now 5.8 g. of $B_{10}H_8(CO)_2$ is added to the solution and the mixture is refluxed for 5 hours under a nitrogen atmosphere. A yellow oil separates and the glyme layer is removed by decantation. The yellow oil which remains is stirred with an excess of an aqueous solution of $(CH_3)_4NCl$. A yellow solid forms which is separated by filtration and recrystallized from water. It is recrystallized again from 100 ml. of a 1% aqueous solution of $(CH_3)_4NCl$ to obtain 1.6 g. of $[(CH_3)_4N]_4B_{12}H_{11}C(O)B_{10}Cl_8COOH \cdot H_2O$.

Analysis calc'd for above formula: B, 25.9; C, 23.5; H, 6.8; N, 6.1. Found: B, 24.6; C, 22.5; H, 6.1; N, 4.7.

The compound obtained in Part C can be reacted with $H_2NOSO_3H$ as described in Part B to obtain $$[(CH_3)_4N]_3HB_{12}H_{11}C(O)B_{10}Cl_8NH_2$$

as a hydrate. This compound and the compound of Part B can be converted to the respective acids $$H_4B_{12}H_{11}C(O)B_{10}Cl_8NH_2$$

and $H_4B_{10}H_9C(O)B_{12}H_{10}NH_2$, by contacting aqueous solutions of the salts with an acid ion-exchange resin. Solutions of the acids can be neutralized with strong bases, e.g., KOH, LiOH, $(CH_3)_3SOH$, and the like, to obtain neutral and acid salts such as $$K_4B_{12}H_{11}C(O)B_{10}Cl_8NH_2$$
$$Li_4B_{10}H_9C(O)B_{12}H_{10}NH_2$$
$$[(CH_3)_3S]_4B_{12}H_{11}C(O)B_{10}Cl_8NH_2$$
$$K_3HB_{10}H_9C(O)B_{12}H_{10}NH_2$$
$$Li_3HB_{12}H_{11}C(O)B_{10}Cl_8NH_2$$
$$[(CH_3)_3S]_3HB_{12}H_{11}C(O)B_{10}Cl_8NH_2$$

and the like.

Example 6 and Part D of Example 1 illustrate generically the compounds of the invention and their preparation in which the anion in Formula 1 is tetravalent and in which A and A′ are combinations of decaborate and dodecaborate groups. Example 6 also illustrates compounds with these two cage structures bearing representative substituents (or X groups) on the boron cage units, e.g., —C(O)OH and —NH$_2$.

By applying the process of Example 9 to the product of Example 6, Part A, a compound can be obtained, to be described later as $[(CH_3)_4N]_3B_{10}H_9C(O)B_{12}H_{10}(CO)$ which, when reacted as described in Example 3 with NaN$_3$ will yield a compound of Formula 1 with a tetravalent anion bearing —NCO groups, e.g., $$[(CH_3)_4N]_3HB_{10}H_9C(O)B_{12}H_{10}NCO$$

which in hydrated form can be written as $$[(CH_3)_4N]_3(H_3O)B_{10}H_9C(O)B_{12}H_{10}NCO$$

*Example 7*

A reaction vessel is charged with 6.0 g. of $$(CH_3)_4NB_{10}H_9[S(CH_3)_2]$$

4 g. of $B_{10}H_8(CO)_2$ and 8 ml. of acetonitrile as described in Example 4. The mixture is refluxed for 6 hours, cooled and filtered to separate 0.2 g. of unreacted $(CH_3)_4NB_{10}H_9[S(CH_3)_2]$. The pale yellow filtrate is evaporated under a stream of air until a viscous residue remains. The residue is mixed thoroughly with 80 ml. of water and a yellow solid forms which is separated by filtration to obtain 3.0 g. of product. The product is recrystallized from (1) 65 ml. of water, and (2) water containing 1 g. of $(CH_3)_4NCl$ to obtain the monohydrate of $[(CH_3)_4N]_2HB_{10}H_8[S(CH_3)_2]C(O)B_{10}H_8C(O)OH$. The compound is a crystalline yellow product which dissolves readily in an aqueous solution of NaOH to form a colorless solution.

Analysis calc'd for $$[(CH_3)_4N]_2(H_3O)B_{10}H_8[S(CH_3)_2]C(O)B_{10}H_8C(O)OH$$

B, 40.4; C, 26.9; H, 9.4; N, 5.2; S, 6.0. Found: B, 41.6; C, 27.2; H, 9.5; N, 5.2; S, 6.2.

The ultraviolet absorption spectrum in acetonitrile of the compound of Example 7 is as follows: $\lambda_{max.}$, 365 m$\mu$ ($\epsilon=27{,}600$); 305 m$\mu$ ($\epsilon=6800$); 237 m$\mu$ ($\epsilon=17{,}600$). The visible and ultraviolet absorption spectra resemble, not unexpectedly, the spectra for the compound of Example 1 which contains an anion of similar structure.

*Example 8*

The product obtained in Example 7, i.e., the monohydrate of $$[(CH_3)_4N]_2HB_{10}H_8[S(CH_3)_2]C(O)B_{10}H_8C(O)OH$$

is dissolved in aqueous sodium hydroxide, and hydroxylamine-O-sulfonic acid is added to the solution with stirring. A white crystalline solid forms rapidly and it is separated by filtration. The product is $$[(CH_3)_4N](NH_4)HB_{10}H_8[S(CH_3)_2]C(O)B_{10}H_8NH_2$$

in which the acidic proton is associated closely with the amine (—NH$_2$ group. The product can, therefore, be represented optionally as $$[(CH_3)_4N](NH_4)B_{10}H_8[S(CH_3)_2]C(O)B_{10}H_8NH_3$$

Analysis calc'd for above formula: C, 19.5; H, 9.6; N, 9.7; S, 7.4. Found: C, 20.0; H, 9.2; N, 9.7; S, 7.5.

Passage of an aqueous solution of the above salt through a column filled with a commercial acidic ion-exchange resin of the crosslinked polystyrenesulfonic acid type will yield a solution of the acid $$H_3B_{10}H_8[S(CH_3)_2]C(O)B_{10}H_8NH_2$$

which can also be written as $$H_2B_{10}H_8[S(CH_3)_2]C(O)B_{10}H_8NH_3$$

*Example 9*

A. A concentrated aqueous solution of $$[(CH_3)_4N]_3(H_3O)B_{10}H_9C(O)B_{10}H_8C(O)OH$$

(see Example 1, Part A) is prepared and concentrated aqueous hydrochloric acid is added to it with stirring. A yellow solid precipitates which is separated by filtration and dried in air. The infrared absorption spectrum of the product shows that it contains the compound $[(CH_3)_4N]_3B_{10}H_9C(O)B_{10}H_8(CO)$.

B. Three grams of $$[(CH_3)_4N]_3(H_3O)B_{10}H_9C(O)B_{10}H_8C(O)OH$$

obtained as described in Example 1, Part A, is heated at 200° C. under very low pressure (less than 0.1 mm. Hg) for 1.5 hours. The infrared absorption spectrum of the product at this stage shows that it is largely $$[(CH_3)_4N]_3B_{10}H_9C(O)B_{10}H_8(CO)$$

Examples 7, 8 and 9 illustrate generically compounds of the invention and their preparation, wherein the anion AC(O)A′ of Formula 1 is trivalent. The anion is characterized by two decaborate groups joined by the —C(O)— group and, further, by the presence of a Z group on a decaborate unit, e.g., dialkyl sulfides and (CO). Examples 7, 8 and 9 also illustrate salts of the trivalent anion which bear substituents or X groups on the boron cage units, e.g., —C(O)OH and —NH$_2$.

Reactants bearing Z groups other than dialkyl sulfides can be employed in the process. To illustrate, $$(CH_3)_4NB_{10}H_9[N(CH_3)_3] \text{ and } B_{10}H_8(CO)_2$$

can be reacted as described in Example 7 to obtain (by adding the desired cation)

$$[(CH_3)_4N]_2HB_{10}H_8[N(CH_3)_3]C(O)B_{10}H_8C(O)OH$$

This product can be reacted with $NH_2OSO_3H$ as described in Example 8 to obtain $$[(CH_3)_4N]_2HB_{10}H_8[N(CH_3)_3]C(O)B_{10}H_8NH_2$$

Similarly, $NaB_{10}H_9(CH_3CN)$ can be reacted with $B_{10}H_8(CO)_2$ or with $B_{10}Cl_8(CO)_2$ to obtain $$Na_2HB_{10}H_8(CH_3CN)C(O)B_{10}H_8C(O)OH$$

or $Na_2HB_{10}H_8(CH_3CN)C(O)B_{10}Cl_8C(O)OH$;

$$CsB_{10}H_9[CH_3C(O)N(CH_3)_2]$$

can be reacted with $B_{10}H_8(CO)_2$ or with $B_{10}Br_8(CO)_2$ to obtain $$Cs_2HB_{10}H_8[CH_3C(O)N(CH_3)_2]C(O)B_{10}H_8C(O)OH$$

or $Cs_2HB_{10}H_8[CH_3C(O)N(CH_3)_2]C(O)B_{10}Br_8C(O)OH$. Each of these products can be reacted as described in Example 8 with $NH_2OSO_3H$ to obtain the —$NH_2$ substituted compounds, viz, $Na_2HB_{10}H_8(CH_3CN)C(O)B_{10}H_8NH_2$, $Cs_2HB_{10}H_8[CH_3C(O)N(CH_3)_2]C(O)B_{10}H_8NH_2$, or $Cs_2HB_{10}H_8[CH_3C(O)N(CH_3)_2]C(O)B_{10}Br_8NH_2$.

The process of Example 7 is operable with bis(carbonyl)dodecaboranes, e.g., $B_{12}H_{10}(CO)_2$. To illustrate, $(CH_3)_4NB_{10}H_9S(CH_3)_2$ can be reacted with $B_{12}H_{10}(CO)_2$ to obtain $[(CH_3)_4N]_2HB_{10}H_9[S(CH_3)_2]C(O)B_{12}H_{10}C(O)OH$ and this compound can then be chlorinated to obtain $[(CH_3)_4N]_2HB_{10}Cl_9[S(CH_3)_2]C(O)B_{12}Cl_{10}C(O)OH$ The $B_{10}$ reactants named in the immediately preceding paragraph can be reacted with the bis(carbonyl)dodecaboranes to obtain, e.g., $Na_2HB_{10}H_8(CH_3CN)C(O)B_{12}H_{10}C(O)OH$, $Cs_2HB_{10}H_8[CH_3C(O)N(CH_3)_2]C(O)B_{12}H_{10}C(O)OH$, and the like. Each of these products can be reacted as described in Example 8 with $NH_2OSO_3H$ to obtain compounds bearing an —$NH_2$ group in place of the —$C(O)OH$ group.

*Example 10*

A mixture of 2.85 g. of $B_{10}Cl_8(CO)_2$, 2.0 g. of $B_{10}H_8[S(CH_3)_2]_2$, and 25 ml. of acetonitrile is refluxed for 2 hours under an atmosphere of nitrogen, employing the procedure described in Example 4. A clear dark red solution forms which is cooled and filtered. The filtrate is evaporated partially in a stream of air and the concentrated residue is filtered again through finely divided diatomaceous earth. Ammonium chloride is added to the filtrate with stirring and a gummy yellow solid forms which is separated by filtration. The solid is dissolved in acetone to give a red solution. The solution is filtered and the filtrate is evaporated to remove the acetone. The residue is mixed with water to form a cloudy yellow solution. Aqueous hydrochloric acid is added to the solution and a yellow solid precipitates. The solid is separated and dissolved in aqueous 8% sodium hydroxide to give a cloudy colorless solution. The cloudy solution is filtered again through diatomaceous earth. The clear filtrate is mixed with cesium chloride and the solution is acidified with dilute hydrochloric acid. A yellow solid precipitates which is separated and recrystallized from water to which cesium chloride is added to assist in precipitation of the purified product. The product is the monohydrate of $CsHB_{10}H_7[S(CH_3)_2]_2C(O)B_{10}Cl_8C(O)OH$. The identity of the compound is confirmed by elemental analysis.

Analysis calc'd for $Cs(H_3O)B_{10}H_7[S(CH_3)_2]_2C(O)B_{10}Cl_8C(O)OH$

B, 25.3; C, 8.4; H, 2.7. Found: B, 24.2; C, 8.8; H, 3.2.

Example 10 illustrates generically compounds of the invention and their preparation, wherein the anion AC(O)A' of Formula 1 is divalent. The anion is characterized by two decaborate groups joined by the —C(O)— group and, further, by the presence of two Z groups on a decaborate cage group, e.g., a dialkyl sulfide. Example 10 also illustrates salts of the divalent anion which bear substituents or X groups on the boron cage units, e.g., —C(O)OH.

In Example 10 both reactants are non-ionic in character and the product which is obtained is a salt of a divalent anion. Reactants bearing Z groups other than dialkyl sulfides can be employed. To illustrate, by using the process of Example 10 and a salt bearing the desired cation in the final step, $B_{10}H_8(CO)_2$ or $B_{10}Cl_8(CO)_2$ can be reacted with $B_{10}H_8[N(C_2H_5)_3]_2$ to yield, respectively, $Cs(H_3O)B_{10}H_7[N(C_2H_5)_3]_2C(O)B_{10}H_8C(O)OH$ and $Cs(H_3O)B_{10}H_7[N(C_2H_5)_3]_2C(O)B_{10}Cl_8C(O)OH$ with $B_{10}HCl_7(CH_3CN)_2$ to obtain $TlHB_{10}Cl_7(CH_3CN)_2C(O)B_{10}H_8C(O)OH$ and $TlHB_{10}Cl_7(CH_3CN)_2C(O)B_{10}Cl_8C(O)OH$ with $B_{10}H_8[HC(O)N(CH_3)_2]_2$ to obtain $[(CH_3)_3S]_2B_{10}H_8[HC(O)N(CH_3)_2]_2C(O)B_{10}H_8C(O)OH$ and $[(CH_3)_3S]_2B_{10}H_8[HC(O)N(CH_3)_2]_2C(O)B_{10}Cl_8C(O)OH$ and the like.

The process of Example 10 is operable with bis-(carbonyl)dodecaboranes, e.g., $B_{12}H_{10}(CO)_2$. With bis-(carbonyl)dodecaborane and the $B_{10}$ reactants in the preceding paragraphs, the following compounds can be obtained:

$Cs_2B_{10}H_7[N(C_2H_5)_3]_2C(O)B_{12}H_{10}C(O)OH$ which can be chlorinated to yield $Cs_2B_{10}H_7[NC_2H_5)_3]_2C(O)B_{12}Cl_{10}C(O)OH$ $Tl_2B_{10}Cl_7(CH_3CN)_2C(O)B_{12}H_{10}C(O)OH$ which can be chlorinated to yield $Tl_2B_{10}Cl_7(CH_3CN)_2C(O)B_{12}Cl_{10}C(O)OH$ and $[(CH_3)_3S]_2B_{10}H_7[HC(O)N(CH_3)_2]_2C(O)B_{12}H_{10}C(O)OH$ which can be chlorinated to yield $[(CH_3)_3S]_2B_{10}H_7[HC(O)N(CH_3)_2]_2C(O)B_{12}Cl_{10}C(O)OH$ The products of Example 10, including the illustrations given above, can be reacted with $H_2NOSO_3H$, as described in Example 6, Part B, to obtain compounds bearing —$NH_2$ substituents in place of the —$C(O)OH$ group.

Compounds of Formula 1 in which the anion AC(O)A' is monovalent are obtained by employing salts of the divalent anion (obtained as described in Example 10) as reactants in the process of Example 9. To illustrate a concentrated aqueous solution of $CsHB_{10}H_7[S(CH_3)_2]_2C(O)B_{10}Cl_8C(O)OH$ is prepared and concentrated hydrochloric acid is added to it with stirring. The precipitate which forms is separated and dried to obtain a compound of the formula $CsB_{10}H_7[S(CH_3)_2]_2C(O)B_{10}Cl_8(CO)$ As a further illustration, a concentrated aqueous solution of the compound obtained in Example 10 is contacted with an acidic ion-exchange resin to obtain a concentrated solution of $H_2B_{10}H_7[S(CH_3)_2]_2C(O)B_{10}Cl_8C(O)OH$. This solution is reacted with sufficient base to obtain an aqueous solution of $[(C_2H_5)_4N]HB_{10}H_7[S(CH_3)_2]_2C(O)B_{10}Cl_8C(O)OH$ The solution is evaporated to dryness to obtain a solid hydrate of $[(C_2H_5)_4N]HB_{10}H_7[S(CH_3)_2]_2C(O)B_{10}Cl_8C(O)OH$ The solid hydrate is heated to 200–250° C. under very low pressure for 1–2 hours and the product which remains is largely $(C_2H_5)_4NB_{10}H_7[S(CH_3)_2]_2C(O)B_{10}Cl_8(CO)$ Compounds bearing halogens other than chlorine can be obtained by the methods of Examples 4 and 5. Fluorine, bromine and iodine can be introduced as substituents by direct halogenation, as illustrated in Example 5, to obtain e.g., $Na_4B_{10}Br_9C(O)B_{10}Br_8COOH$, $Cs_4B_{10}F_9C(O)B_{10}F_8COOH$

[(C₂H₅)₄N]₄B₁₀I₉C(O)B₁₀I₈COOH, and the like. Partially halogenated compounds, e.g.,

[(CH₃)₄N]₄B₁₀H₅Cl₄C(O)B₁₀H₂Cl₆COOH can be obtained by discontinuing passage of halogen into the reaction mixture at an intermediate stage in the process. Compounds bearing two or more unlike halogens can be obtained by halogenating partially with one halogen and completing the process with a second halogen to obtain, e.g., Tl₄B₁₀Cl₅Br₄C(O)B₁₀Cl₅Br₃COOH.

Compounds bearing reactive substituents, e.g.,

—C(O)OH, —NH₂, —NCO and the like, can be employed as intermediates to obtain products bearing other X groups. To illustrate, compounds bearing —C(O)OH groups can be reacted (1) with alcohols to obtain products bearing —C(O)OR groups, where R is the organic radical derived from the alcohol, (2) with thionyl halides to obtain products bearing —C(O)Y groups, where Y is halogen, (3) with ammonia to obtain initially the substituent group

—C(O)ONH₄ which can be heated to split out water and obtain a product bearing —C(O)NH₂ groups and, with further heating, a product bearing —CN groups. To illustrate, the product of Example 1, Part A, can be (1) esterified with C₂H₅OH to obtain

[(CH₃)₄N]₃(H₃O)B₁₀H₉C(O)B₁₀H₈C(O)OC₂H₅

(2) reacted with SOCl₂ to obtain

[(CH₃)₄N]₃(H₃O)B₁₀H₉C(O)B₁₀H₈C(O)Cl (3) reacted with ammonium hydroxide to obtain

[(CH₃)₄N]₃(H₃O)B₁₀H₉C(O)B₁₀H₈C(O)ONH₄ which can be heated to split out water to obtain, initially,

[(CH₃)₄N]₃HB₁₀H₉C(O)B₁₀H₈C(O)NH₂ and, with continued heating to split out more water,

[(CH₃)₄N]₂(NH₄)HB₁₀H₉C(O)B₁₀H₈NHC(O)NHC₃H₅

Compounds bearing —NH₂ substituents can be (1) alkylated, e.g., with a dialkyl sulfate, to obtain products bearing —NR′₂ groups, where R′ is an alkyl group, (2) acylated, e.g., with an acyl halide, to obtain products bearing —NHC(O)R groups, where R is the organic radical from the acyl halide, (3) sulfonated by reaction with sulfonyl halides to obtain products bearing —NHSO₂R groups, where R is the organic radical present in the sulfonyl halide, (4) reacted with isocyanates to obtain products bearing ureido[—NHC(O)NHR or —NHC(O)NR₂] groups, where R is the organic group present in the isocyanate. To illustrate, the compound of Example 2 can be reacted with (CH₃)₂SO₄ to obtain

[(CH₃)₄N]₂(NH₄)HB₁₀H₉C(O)B₁₀H₈N(CH₃)₂ with CH₃C(O)Cl to obtain

[(CH₃)₄N]₂(NH₄)HB₁₀H₉C(O)B₁₀H₈NHC(O)CH₃ with C₆H₅SO₂Cl to obtain

[(CH₃)₄N]₂(NH₄)HB₁₀H₉C(O)B₁₀H₈NHSO₂C₆H₅ and with C₆H₅NCO to obtain

[(CH₃)₄N]₂(NH₄)HB₁₀H₉C(O)B₁₀H₈NHC(O)NHC₆H₅

Isothiocyanates can be used in place of isocyanates to obtain products bearing —NHC(S)NHR or —NHC(S)NR₂ groups, e.g., allyl isothiocyanate will yield

[(CH₃)₄N]₃HB₁₀H₉C(O)B₁₀H₈CN

Compounds bearing isocyanate (—NCO) substituents can be reacted (1) with alcohols to obtain products bearing —NHC(O)OR groups, where R is the organic radical of the alcohol, (2) with amines to obtain products bearing ureido groups as defined earlier, and (3) with hydrazines to obtain products in which the substituents are semicarbazide groups, e.g., —NHC(O)NHNHR, where R is the organic radical in the hydrazine.

Exhaustive alkylation of compounds bearing amine groups can be employed to obtain products of the invention containing a Z group which is a tertiary amine. Compounds can be obtained by this procedure which are free of X groups. To illustrate, the acid

H₃B₁₀H₈[S(CH₃)₂]C(O)B₁₀H₈NH₂ can be alkylated with dimethyl sulfate to yield

H₂B₁₀H₈[S(CH₃)₂]C(O)B₁₀H₈[N(CH₃)₃]

Compounds free of X and Z groups may be obtained as described earlier by reacting, e.g., a dodecahydrododecaborate salt with a monocarbonyl-dodecaborate. To illustrate, Na₂B₁₂H₁₂ may be reacted with (CH₃)₄NH₁₂H₁₁CO, employing conditions described in the examples, to obtain [(CH₃)₄N]₄B₁₂H₁₁C(O)B₁₂H₁₁.

The compounds of the invention bearing carbon monoxide groups, of which the product of Example 9 is a representative illustration, can be reacted with water, alcohols, ammonia, amines, and the like to obtain products bearing —C(O)OH, —C(O)OR, —C(O)NH₂, —C(O)NR₂, and the like groups in which R has the meaning given earlier. To illustrate, [(CH₃)₄N]₃B₁₀H₉C(O)B₁₀H₈(CO) can be reacted with water to obtain

[(CH₃)₄N]₃HB₁₀H₉C(O)B₁₀H₈C(O)OH with C₄H₉OH to obtain

[(CH₃)₄N]₃HB₁₀H₉C(O)B₁₀H₈C(O)OC₄H₉ with ammonia to obtain

[(CH₃)₄N]₃(NH₄)B₁₀H₉C(O)B₁₀H₈C(O)NH₂ with C₆H₅NH₂ to obtain

[(CH₃)₄N]₃(C₆H₅NH₃)B₁₀H₉C(O)B₁₀H₈C(O)NHC₆H₅ with (C₄H₉)₂NH to obtain

[(CH₃)₄N]₃[(C₄H₉)₂NH₂]B₁₀H₉C(O)B₁₀H₈C(O)N(C₄H₉)₂ and the like. The above procedure provides a further versatile route to compounds of the invention.

The reactions described above are generic for compounds bearing functional substituents. The illustrations show the broad range of substituents which can be introduced into the anion. The reactions of these functional substituents are comparable to the reactions of the same substituents when present on a carbocyclic aromatic compound. The many known reactions of the organic carbocyclic compounds can, surprisingly, be employed for the inorganic compounds of the invention.

METATHETIC REACTIONS

Metathetic reactions which the compounds of the invention will undergo were discussed previously, particularly in the paragraphs following Example 1. The processes discussed in those paragraphs are generic to the preparation of a broad range of salts which fall within the scope of Formula 1. Solutions of the compounds of the examples can be contacted with acid ion-exchange resins to obtain solutions of the acids and these solutions can be neutralized with appropriate bases, oxides or simple salts to obtain compounds with the desired cation M. A few of the broad range of products which can be obtained are illustrated below employing acids obtained from representative salts disclosed in the examples.

| Acid | Neutralizing Agent | Product |
|---|---|---|
| $H_4B_{10}H_9C(O)B_{10}H_8NH_2$ | TlOH | $Tl_4B_{10}H_9C(O)B_{10}H_8NH_2$ |
|  | $NH_2NH_2$ | $(NH_2NH_3)_3HB_{10}H_9C(O)B_{10}H_8NH_2$ |
|  | $(CH_3)_4AsOH$ | $[(CH_3)_4As]_3HB_{10}H_9C(O)B_{10}H_8NH_2$ |
| $H_4B_{10}H_9C(O)B_{10}Cl_8C(O)OH$ | $C_{10}H_7NH_2$ | $(C_{10}H_7NH_3)_4B_{10}H_9C(O)B_{10}Cl_8C(O)(OH)$ |
|  | Dipyridyl | $[(C_5H_4N)_2H]_4B_{10}H_9C(O)B_{10}Cl_8C(O)OH$ |
|  | TlOH | $Tl_4B_{10}H_9C(O)B_{10}Cl_8COOTl$ |
| $H_4B_{10}Cl_9C(O)B_{10}Cl_8C(O)OH$ | $NH_4OH$ | $(NH_4)_3HB_{10}Cl_9C(O)B_{10}Cl_8C(O)OH$ |
|  | $C_5H_5N(C_{16}H_{33})OH$ | $(C_5H_5NHC_{16}H_{33})_3HB_{10}Cl_9C(O)B_{10}Cl_8C(O)OH$ |
|  | $NH_2(CH_2)_6NH_2$ | $[NH_3(CH_2)_6NH_3]_2B_{10}Cl_9C(O)B_{10}Cl_8C(O)OH$ |
| $H_4B_{10}H_9C(O)B_{12}H_{11}NH_2$ | LiOH | $Li_3HB_{10}H_9C(O)B_{12}H_{11}NH_2$ |
|  | 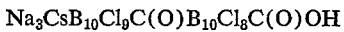 | 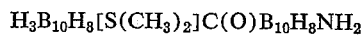 |
|  | $(H_2NCNH_2)_2CO_3$ | $(H_2NCNH_2)_3HB_{10}H_9C(O)B_{12}H_{11}NH_2$ |
|  | $Co(NH_3)_6Cl_3$ | $[Co(NH_3)_6]_2HB_{10}H_9C(O)B_{12}H_{11}NH_2$ |
| $H_3B_{10}H_8[S(CH_3)_2]C(O)B_{10}H_8$-$C(O)OH$ | $AlCl_3$ | $Al(H_2O)_6B_{10}H_8[S(CH_3)_2]C(O)B_{10}H_8C(O)OH$ |
|  | $FeCl_3$ | $Fe(H_2O)_6B_{10}H_8[S(CH_3)_2]C(O)B_{10}H_8C(O)OH$ |
|  | $BaCl_2$ | $Ba_3B_{10}H_8[S(CH_3)_2]C(O)B_{10}H_8C(O)OH$ |

Salts with mixed cations can also be obtained by partial neutralization of the acid with one base followed by further neutralization with a second base. To illustrate, $H_4B_{10}Cl_9C(O)B_{10}Cl_8C(O)OH$ can be neutralized partially with NaOH followed by CsOH to obtain $$Na_3CsB_{10}Cl_9C(O)B_{10}Cl_8C(O)OH$$

and $$Na_3CsB_{10}Cl_9C(O)B_{10}Cl_8C(O)OCs$$

and $$H_3B_{10}H_8[S(CH_3)_2]C(O)B_{10}H_8C(O)OH$$

can be partially neutralized with $(CH_3)_4NOH$ followed by $(CH_3)_3SOH$ to obtain $$[(CH_3)_4N]_2(CH_3)_3SB_{10}H_8[S(CH_3)_2]C(O)B_{10}H_8C(O)OH$$

UTILITY

The compounds of the invention are generically useful as components of rocket propellants, flares and fireworks compositions to impart a pleasing color and sparkle to the display. Every one of the compounds of the invention contains an anion which has a high percentage by weight of boron which imparts its characteristic color to a fireworks, rocket or flare display. The compounds of the invention can have a wide range of cations, designated as M, and it is thus possible to provide a broad spectrum of colors to any display or flare by choice of appropriate cation. The compounds can be used in combination with oxidizing agents, e.g., lithium perchlorate, sodium nitrate, strontium peroxide, manganese dioxide, and the like to provide the desired propulsive effect and color. The following combinations, in which the boron-containing compounds of the invention can be from 5–25% by weight of the combination, are illustrative of the compositions which can be used:

$NaNO_3$—$[(CH_3)_4N]_3(H_3O)B_{10}H_9C(O)B_{10}H_8C(O)OH$ $LiNO_3$—$Na_4B_{10}H_9C(O)B_{10}H_8C(O)ONa$ $SrCl_2$—$NaNO_3$—$[(CH_3)_4N]_2(NH_4)$
$H[B_{10}H_9C(O)B_{10}H_8NH_2]$ $LiClO_4$—$[(CH_3)_4N]_3(H_3O)B_{10}H_9C(O)B_{10}H_8NCO$ $NH_4NO_3$—$CuNO_3$—$[(CH_3)_4N]_4B_{10}Cl_9C(O)B_{10}Cl_8C(O)OH$ $MnO_2$—$Sr(NO_3)_2$—$[(CH_3)_4N]_3(H_3O)$
$B_{10}H_9C(O)B_{10}Cl_8C(O)OH$ $KNO_3$—$[(CH_3)_4N]_2(NH_4)HB_{10}H_9C(O)B_{12}H_{11}NH_2$ $CsNO_3$—$Cu(NO_3)_2$—$[(CH_3)_4N]_3B_{10}H_9C(O)B_{10}H_8(CO)$ and the like. These examples are not limiting but are illustrative of the combinations which are possible for use in the above field.

The compounds of the invention are useful in the fields of high energy fuels. For this purpose, unsubstituted or only partially substituted compounds are preferred, e.g., compounds in which the number of substituents on the boron cage groups, i.e., the total number of X groups, is at most 10. The compounds can be used in combination with oxidizing agents, e.g., nitric acid, fluorine oxide, and the like. They can be used in solution in hydrazine or N,N-disubstituted hydrazines, e.g., N,N-dimethylhydrazine. They are useful, therefore, as components of liquid and solid rocket propellant fuels. To illustrate, combinations which can be employed include $$H_3B_{10}H_8[S(CH_3)_2]C(O)B_{10}H_8NH_2$$

in hydrazine, $H_4B_{10}H_9C(O)B_{10}H_8C(O)OH$ in hydrazine, $(NH_2NH_3)_4B_{10}H_9C(O)B_{10}Cl_8C(O)OH$ in hydrazine, and the like. The boron-containing component can be present in about 5–50% by weight of the solution.

The compounds of the invention, exclusive of the fully halogenated products, are useful as impregnating agents in the preparation of resistors. To illustrate, a section of a cotton string is immersed in a nearly saturated solution of $[(CH_3)_4N]_3(H_3O)B_{10}H_9C(O)B_{10}H_8C(O)OH$ in a mixture of acetonitrile and hydrochloric acid. The string is withdrawn from the solution and the solvent is removed by drying in air. A free flame is applied to the dried impregnated string and it burns to yield a coherent ash which in size and shape resembles the original string. The residual skeleton is of sufficient coherence to permit embedding in paraffin. The section of residue, thus prepared, shows a resistance in excess of 10,000 ohms/inch. The residue from a control section of string is very small and shapeless and it cannot be handled. All of the compounds of the invention, illustrated generically in the examples, exclusive of those with exceptionally high halogen content, are useful for the above purpose.

Highly halogenated compounds, e.g., salts of the $B_{10}Cl_9C(O)B_{10}Cl_8C(O)OH^{-4}$ anion, are useful as impregnating agents for retarding the combustion of cellulosic products. To illustrate, an absorbent cellulose sheet is immersed in a solution of $$[(CH_3)_4N]_4B_{10}Cl_9C(O)B_{10}Cl_8C(O)OH$$

removed and dried in air. It does not burn freely when touched with a free flame.

In the group of compounds which fall within the scope of Formula 1, the component M represents a wide range of groups which are readily interchangeable by metathetic reactions described earlier. All of the salts which fall within the scope of Formula 1 can be used to prepare the group of acids which can be represented as $H_qAC(O)A'$, where $q$ is the valence of the anion, $AC(O)A'$ [i.e., $q$ is 1, 2, 3 or 4], by passing aqueous or alcoholic solutions of the salts through an acidic ion-exchange resin as described earlier. The acids of this group, exclusive of the compounds which contain a plurality of $NH_2$ or substituted $NH_2$ groups as X substituents, are strong acids. Aqueous solutions of the acids are useful as agents for absorbing noxious basic materials from the air, e.g., traces of ammonia, lower alkylamines, and the like. To illustrate, air contaminated with methylamines is passed through an aqueous solution of $$H_4B_{10}Cl_9C(O)B_{10}Cl_8C(O)OH$$

and the amines are removed.

As many apparently widely different embodiments of this invention may be made without departing from the spirit and scope thereof, it is to be understood that this invention is not limited to the specific embodiments thereof described herein.

The embodiments of the invention in which an exclusive property or privilege is claimed are defined as follows:

1. A polyboron compound of the formula

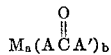

wherein:

M is a cation,

A is a polyboron group bonded to the carbon of the C(O) group through a boron atom of said polyboron group and is selected from the class consisting of $B_{10}H_{9-m-s}X_s(Z)_m$ and $B_{12}H_{11-m-t}X_t(Z)_m$ wherein X is bonded to boron and is selected from the group consisting of halogen, hydrocarbon of up to 18 carbon atoms, carbonyl,

azido, halocarbonyl, halomethyl, hydroxy, —OR', —CH(OR')$_2$, —CR'(OR')$_2$, —OC(O)R',

—C(O)OR' isocyanato, thiocyanato, isothiocyanato, —SR', hydoxymethyl, —CH$_2$OR', —CH$_2$NR$_2$', cyano, amino, —NHR', —NR$_2$', trihalomethyl,

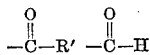

nitro, nitroso, —N=N—Ar wherein Ar is aromatic hydrocarbon of up to 18 carbon atoms, sulfo, —SO$_2$R' and acetoxymercury; wherein R' is a monovalent hydrocarbyl group of at most 18 carbon atoms;

Z is selected from the class consisting of (a) SR$_2^2$ wherein R$^2$ is hydrocarbyl of up to 18 carbon atoms free of acetylenic unsaturation which can contain up to two substituents selected from the class consisting of halogen; —OH; —NO$_2$; —COOH and metal and nitrogen-base salts thereof; —NH$_2$, (lower alkyl)NH, di(lower alkyl)N, and salts thereof; —C(O)NH$_2$; —C(O)NHQ; —C(O)NQ$_2$;

—C(O)OQ

—OC(O)OQ, —CN, —NHC(O)NH$_2$ and

—NHC(O)NHQ wherein Q is hydrocarbyl of up to 8 carbon atoms free of acetylenic unsaturation, and groups wherein the two R$^2$'s are joined together to form a ring with the sulfur of up to 5 carbon atoms; (b) R$_2$'SO$_2$, (c) R$_3$'P, (d) R$_3$'N, (e) HC(O)NR$_2$', (f) R'C(O)NR$_2$', (g) R'CN and (h) CO wherein R' is hydrocarbyl of up to 18 carbon atoms, and any two R' groups in the same entity can be joined together to form a ring with the heteroatom; $m$ is a cardinal number of from 0 to 2, inclusive; $s$ is a cardinal number of from 0 to $9-m$, inclusive; and $t$ is a cardinal number of from 0 to $11-m$, inclusive;

A' is a polyboron group bonded to the carbon of the C(O) group through a boron atom of said polyboron group and is selected from the class consisting of $B_{10}H_{9-n-v}X_v(Z)_n$ and $B_{12}H_{11-n-p}X_p(Z)_n$ wherein X and Z are as defined above; $n$ is a cardinal number of from 0 to 1, inclusive; $v$ is a cardinal number of from 0 to $9-n$, inclusive; and $p$ is a cardinal number of from 0 to $11-n$, inclusive; and $a$ and $b$ each are cardinal numbers of from 1 to 4, inclusive, whose values are determined by the formula $$b = \frac{a(\text{valence of M})}{4-(m+n)}$$

wherein $4-(m+n)$ is the value of the negative ionic charge of the anion AC(O)A'.

2. A compound of claim 1 wherein A is $B_{10}H_{9-m-s}X_s(SR_2^2)_m$ and A' is $B_{10}H_{9-n-v}X_v(CO)_n$ in which R$^2$ and $x$ are defined as in claim 1.

3. A compound of claim 1 wherein A is $B_{10}H_{9-m-s}X_s(SR_2^2)_m$ and A' is $B_{12}H_{11-n-p}X_p(CO)_n$ in which R$^2$ and $x$ are defined as in claim 1.

4. A compound of claim 1 wherein A is $B_{10}H_{9-m-s}(\text{Halogen})_s(SR_2^2)_m$ in which each R$^2$ is defined in claim 1; and A' is $B_{10}H_{9-v'}(\text{Halogen})_{v'}X'_{v'}$ in which X' is selected from the group consisting of carboxy and amino; $v'$ is a cardinal number of from 0 to 1, inclusive; and $v$ is a cardinal number of from 0 to $9-v'$, inclusive.

5. A compound of claim 1 wherein A is $B_{10}H_{9-m-s}(\text{Halogen})_s(SR_2^2)_2$ in which each R$^2$ is defined as in claim 1; and A' is $B_{12}H_{11-p'-p}(\text{Halogen})_pX'_{p'}$ in which X' is selected from the group consisting of carboxy and amino; $p'$ is a cardinal number of from 0 to 1, inclusive; and $p$ is a cardinal number of from 0 to $11-p'$, inclusive.

6. A compound of claim 1 wherein $s$, $t$, $v$, and $p$ are zero.

7. A compound of claim 1 wherein $m$ and $n$ are zero.

8. A compound of claim 7 wherein $s$, $t$, $v$, and $p$ are zero.

9. [(CH$_3$)$_4$N]$_3$(H$_3$O)B$_{10}$H$_9$C(O)B$_{10}$H$_8$C(O)OH.
10. [(CH$_3$)$_4$N]$_2$(NH$_4$)H[B$_{10}$H$_9$C(O)B$_{10}$H$_8$NH$_2$].
11. [(CH$_3$)$_4$N]$_3$(H$_3$O)B$_{10}$H$_9$C(O)B$_{10}$H$_8$NCO.
12. [(CH$_3$)$_4$N]$_4$B$_{10}$Cl$_9$C(O)B$_{10}$Cl$_8$C(O)OH.
13. [(CH$_3$)$_4$N]$_2$(H$_3$O)B$_{10}$H$_8$[S(CH$_3$)$_2$]
C(O)B$_{10}$H$_8$C(O)OH.

14. In a process for preparing the polyboron compounds of claim 1 the step which comprises reacting (a) a bis(carbonyl)polyborane selected from the class consisting of $B_{10}H_{8-d}X_d(CO)_2$ and $B_{12}H_{10}(CO)_2$ wherein X is defined as in claim 1, and $d$ is a cardinal number of from 0 to 8, inclusive, and (b) a polyborate compound selected from the class consisting of $M_a(B_{10}H_{10-f}X_f)_b$, $M_a(B_{12}H_{12-g}X_g)_b$, $M_{(2-h)}[B_{10}H_{10-h-i}X_i(Z)_h]_r^{(h-2)}$ and $M_{(2-h)}[B_{12}H_{12-h-k}X_k(Z)_h]_r^{(h-2)}$ wherein M, X and Z are defined as in claim 1; $a$ and $b$ are positive whole numbers which are determined by the valence of M; $f$ is a cardinal number of 0 to 9, inclusive; $g$ is a cardinal number of 0 to 11, inclusive; $h$ is a cardinal number of 1 to 2, inclusive; $i$ is a cardinal number of 0 to $(9-h)$, inclusive; $k$ is a cardinal number of 0 to $(11-h)$, inclusive; and $r$ is a cardinal number of at least 1 and is otherwise equal to the valence of M; $(2-h)$ represents the number of M groups and is a cardinal number of from 0 to 1, inclusive; and $(h-2)$ is the valence of the group in brackets and is a cardinal number of from 0 to $-1$, inclusive.

15. The process of claim 14 carried out at a temperature of from 25° C. to 175° C. in a solvent inert to the reactants.

16. The process of claim 14 wherein the reactants are B$_{10}$H$_8$(CO)$_2$ and (NH$_4$)$_2$B$_{10}$H$_{10}$.

17. The process of claim 14 wherein the reactants are B$_{10}$H$_8$(CO)$_2$ and (CH$_3$)$_4$NB$_{10}$H$_9$[S(CH$_3$)$_2$].

No references cited.

LORRAINE A. WEINBERGER, *Primary Examiner.*

ALBERT P. HALLUIN, *Assistant Examiner.*

UNITED STATES PATENT OFFICE
CERTIFICATE OF CORRECTION

Patent No. 3,334,136    Dated August 1, 1967

Inventor(s) Walter H. Knoth, Jr. and Norman E. Miller

It is certified that error appears in the above-identified patent and that said Letters Patent are hereby corrected as shown below:

Col. 1, line 63, the formula should have no parenthesis following it, and line 64, a -- ) -- should follow the "I";

Col. 2, line 9, "($\overset{O}{\overset{\|}{C}}$-R)" should be -- ($\overset{O}{\overset{\|}{C}}$-R') --;

Col. 3, -- a -- has been omitted between "by" and "carbonylic";

Col. 7, last line, the latter half of the formula should read -- ...$]_2 C(O)B_{12}H_{10}NH_2$ --;

Col. 8, line 13, the subscript just before the closing bracket should be -- 2 --; formula between lines 45 and 49, the formula, just before "and" should be -- $CH_3$, -- rather than "$CN_3$,";

Col. 10, line 27, the small letters "a" and "b" should both be subscripts;

Col. 13, line 54, "100 ml." should be -- 100-ml. --;

Col. 17, line 3, -- N -- has been omitted in the formula following -- [$(CH_3)_4$ --; line 15, the period has been omitted following -- atmosphere --;

Col. 23, line 42, the formula should be:
-- [$(CH_3)_4 N]_3 HB_{10}H_9 C(O)B_{10}H_8 CN$. --; line 73, the formula should read -- [$(CH_3)_4 N]_2 (NH_4)HB_{10}H_9 C(O)B_{10}H_8 NHC(O)NHC_3H_5$. --;

Col. 24, line 21, the formula should read -- $(CH_3)_4 NB_{12}H_{11}CO$,

Col. 27, Claim 1, line 30, "doxymethyl," should be -- droxymethyl, --; line 41, "$SR_2^2$" should be -- $SR_2^-$ --; and Col. 28, line 20, the formula should be -- $B_{10}H_{9-v'-v}$... --.

Signed and sealed this 10th day of April 1973.

[SEAL]
Attest:

EDWARD M. FLETCHER, JR.            ROBERT GOTTSCHALK
Attesting Officer                  Commissioner of Patents